United States Patent
Foss, Jr.

(10) Patent No.: US 7,204,412 B2
(45) Date of Patent: Apr. 17, 2007

(54) FAMILY STORED VALUE CARD PROGRAM

(75) Inventor: Sheldon H. Foss, Jr., Suwanee, GA (US)

(73) Assignee: CompuCredit Intellectual Property Holdings Corp. III, Las Vegas, NV (US)

( * ) Notice: Subject to any disclaimer, the term of this patent is extended or adjusted under 35 U.S.C. 154(b) by 0 days.

(21) Appl. No.: 11/022,739

(22) Filed: Dec. 27, 2004

(65) Prior Publication Data

US 2005/0098624 A1     May 12, 2005

Related U.S. Application Data

(63) Continuation-in-part of application No. 10/685,277, filed on Oct. 14, 2003.

(51) Int. Cl.
*G06K 5/00*     (2006.01)

(52) U.S. Cl. .................. 235/380; 235/379; 235/381; 705/64; 705/68

(58) Field of Classification Search ............... 235/380, 235/379, 381; 705/64, 68
See application file for complete search history.

(56) References Cited

U.S. PATENT DOCUMENTS

| | | | |
|---|---|---|---|
| 4,001,550 A | 1/1977 | Schatz | |
| 4,104,515 A | 8/1978 | Thornburg et al. | |
| 4,346,442 A | 8/1982 | Musmanne | |
| 4,360,727 A | 11/1982 | Lehmann | |
| 4,376,978 A | 3/1983 | Musmanne | |
| 4,417,138 A | 11/1983 | Pfeiffer | |
| 4,689,478 A | 8/1987 | Hale et al. | |
| 4,694,397 A | 9/1987 | Grant et al. | |
| 4,718,009 A | 1/1988 | Cuervo | |
| 4,742,457 A | 5/1988 | Leon et al. | |
| 4,755,940 A | 7/1988 | Brachti et al. | |
| 4,774,663 A | 9/1988 | Musmanno et al. | |
| 4,877,947 A | 10/1989 | Mori | |
| 4,877,950 A | 10/1989 | Halpern | |
| 4,879,455 A | 11/1989 | Butterworth et al. | |
| 5,010,485 A | 4/1991 | Bigari | |
| 5,025,138 A | 6/1991 | Cuervo | |
| 5,025,372 A | 6/1991 | Burton | |
| 5,175,416 A | 12/1992 | Mansvelt et al. | |
| 5,231,569 A | 7/1993 | Myatt et al. | |
| 5,262,941 A | 11/1993 | Saladin et al. | |
| 5,297,026 A | 3/1994 | Hoffman | |
| 5,420,405 A | 5/1995 | Chasek | |
| 5,428,684 A | 6/1995 | Akiyama et al. | |
| 5,436,971 A | 7/1995 | Armbrust et al. | |
| 5,444,616 A | 8/1995 | Nair et al. | |
| 5,457,305 A | 10/1995 | Akel et al. | |
| 5,475,585 A | 12/1995 | Bush | |
| 5,485,510 A | 1/1996 | Colbert | |

(Continued)

*Primary Examiner*—Michael G. Lee
*Assistant Examiner*—Allyson N Trail
(74) *Attorney, Agent, or Firm*—Smith Frohwein Tempel Greenlee Blaha, LLC; Gregory Scott Smith

(57) ABSTRACT

A family stored value card program is provided. One embodiment is a method for implementing a stored value card program. One such method comprises: identifying an existing stored value card account; and enabling a first customer associated with the existing stored value card account to establish a new stored value card account associated with a second customer, the new stored value card account linked to the first stored value card account.

1 Claim, 17 Drawing Sheets

U.S. PATENT DOCUMENTS

| | | |
|---|---|---|
| 5,504,677 A | 4/1996 | Pollin |
| 5,511,023 A | 4/1996 | Schrenk |
| 5,536,045 A | 7/1996 | Adams |
| 5,557,516 A | 9/1996 | Hogan |
| 5,559,887 A | 9/1996 | Davis et al. |
| 5,572,004 A | 11/1996 | Raimann |
| 5,577,121 A | 11/1996 | Davis et al. |
| 5,621,796 A | 4/1997 | Davis et al. |
| 5,637,845 A | 6/1997 | Kolls |
| 5,644,118 A | 7/1997 | Hayashida |
| 5,652,786 A | 7/1997 | Rogers |
| 5,689,100 A | 11/1997 | Carrithers |
| 5,692,132 A | 11/1997 | Hogan |
| 5,705,798 A | 1/1998 | Tarbox |
| 5,710,889 A | 1/1998 | Clark |
| 5,732,136 A | 3/1998 | Murphree |
| 5,770,843 A | 6/1998 | Rose |
| 5,811,771 A | 9/1998 | Dethloff |
| 5,815,657 A | 9/1998 | Williams et al. |
| 5,834,757 A | 11/1998 | Fernandes et al. |
| 5,845,260 A | 12/1998 | Nakano |
| 5,864,830 A | 1/1999 | Armetta et al. |
| 5,870,456 A | 2/1999 | Rogers |
| 5,870,724 A | 2/1999 | Lawlor et al. |
| 5,884,289 A | 3/1999 | Anderson et al. |
| 5,890,140 A | 3/1999 | Clark |
| H1794 H | 4/1999 | Claus |
| 5,914,472 A | 6/1999 | Foladare et al. |
| 5,924,084 A | 7/1999 | De Rooij |
| 5,936,221 A | 8/1999 | Corder et al. |
| 5,940,811 A | 8/1999 | Norris |
| 5,943,423 A | 8/1999 | Muftic |
| 5,952,639 A | 9/1999 | Ohki |
| 5,953,710 A | 9/1999 | Fleming |
| 5,955,961 A | 9/1999 | Wallerstein |
| 5,984,192 A | 11/1999 | Calcavara, Jr. et al. |
| 5,987,439 A | 11/1999 | Gustin et al. |
| 6,010,067 A | 1/2000 | Elbaum |
| 6,016,955 A | 1/2000 | De Rooij et al. |
| 6,045,050 A | 4/2000 | Ippolito et al. |
| 6,047,888 A | 4/2000 | Dethloff |
| 6,062,472 A | 5/2000 | Cheung |
| 6,065,675 A | 5/2000 | Teicher |
| RE36,788 E | 7/2000 | Mansvelt |
| 6,095,411 A | 8/2000 | Schrenk |
| 6,105,007 A | 8/2000 | Norris |
| 6,105,862 A | 8/2000 | Pailles et al. |
| 6,105,865 A | 8/2000 | Hardesty |
| 6,119,946 A | 9/2000 | Teicher |
| 6,126,069 A | 10/2000 | Stiefel et al. |
| 6,129,275 A | 10/2000 | Urquhart et al. |
| 6,138,907 A | 10/2000 | Mori et al. |
| 6,142,368 A | 11/2000 | Mullins et al. |
| 6,142,369 A | 11/2000 | Jonstromer |
| 6,152,365 A | 11/2000 | Kolls |
| 6,167,387 A | 12/2000 | Lee-Wai-Yin |
| 6,173,269 B1 | 1/2001 | Solokl et al. |
| 6,182,895 B1 * | 2/2001 | Albrecht .................... 235/380 |
| 6,243,688 B1 | 6/2001 | Kalina |
| 6,279,824 B1 | 8/2001 | Park |
| 6,293,462 B1 | 9/2001 | Gangi |
| 6,295,522 B1 | 9/2001 | Boesch |
| 6,325,292 B1 | 12/2001 | Sehr |
| 6,327,578 B1 | 12/2001 | Linehan |
| 6,354,490 B1 | 3/2002 | Weiss |
| 6,394,343 B1 | 5/2002 | Berg et al. |
| 6,422,462 B1 | 7/2002 | Cohen |
| 6,439,456 B1 | 8/2002 | Bansal et al. |
| 6,450,407 B1 | 9/2002 | Freeman et al. |
| 6,488,206 B1 | 12/2002 | Flaig et al. |
| 6,505,171 B1 | 1/2003 | Cohen et al. |
| 6,505,772 B1 | 1/2003 | Mollett et al. |
| 6,507,644 B1 | 1/2003 | Henderson et al. |
| 6,527,192 B1 | 3/2003 | Altschul et al. |
| 6,560,581 B1 | 5/2003 | Fox |
| 6,578,761 B1 | 6/2003 | Spector |
| 6,587,841 B1 | 7/2003 | DeFrancesco |
| 6,601,771 B2 | 8/2003 | Charrin |
| 6,611,819 B1 | 8/2003 | Oneda |
| 6,615,189 B1 | 9/2003 | Phillips et al. |
| 6,615,190 B1 | 9/2003 | Slater |
| 6,739,506 B1 | 5/2004 | Constantine |
| 6,748,532 B1 | 6/2004 | Digiorgio |
| 6,760,796 B1 | 7/2004 | Rossmann |
| 6,764,003 B1 | 7/2004 | Martschitsch |
| 6,786,400 B1 | 9/2004 | Bucci |
| 6,793,135 B1 | 9/2004 | Ryoo |
| 6,796,497 B2 | 9/2004 | Benkert et al. |
| 6,805,287 B2 | 10/2004 | Bishop et al. |
| 6,805,289 B2 | 10/2004 | Noriega et al. |
| 6,814,285 B1 | 11/2004 | Stroup |
| 6,816,058 B2 | 11/2004 | McGregor et al. |
| 6,820,802 B2 | 11/2004 | Biggar et al. |
| 6,820,803 B1 | 11/2004 | Browning et al. |
| 6,830,178 B2 | 12/2004 | Jimenez |
| 6,834,271 B1 | 12/2004 | Hodgson |
| 6,834,796 B2 | 12/2004 | Anvekar et al. |
| 6,857,566 B2 | 2/2005 | Wankmueller |
| 6,865,547 B1 | 3/2005 | Brake, Jr. et al. |
| 2001/0007332 A1 | 7/2001 | Kjonaas et al. |
| 2001/0011249 A1 | 8/2001 | Yanagihara et al. |
| 2001/0013018 A1 | 8/2001 | Awano |
| 2001/0013545 A1 | 8/2001 | Hogan |
| 2001/0029489 A1 | 10/2001 | Brookner et al. |
| 2001/0032878 A1 | 10/2001 | Tsiounis et al. |
| 2001/0034722 A1 | 10/2001 | Tidball et al. |
| 2001/0037299 A1 | 11/2001 | Nichols et al. |
| 2001/0042784 A1 | 11/2001 | Fite et al. |
| 2001/0045454 A1 | 11/2001 | Gangi |
| 2002/0002533 A1 | 1/2002 | Singhal |
| 2002/0002534 A1 | 1/2002 | Davis et al. |
| 2002/0020738 A1 | 2/2002 | Campbell et al. |
| 2002/0033417 A1 | 3/2002 | Jeon |
| 2002/0040925 A1 | 4/2002 | Weber |
| 2002/0083012 A1 * | 6/2002 | Bush et al. .................... 705/76 |
| 2002/0088849 A1 | 7/2002 | Nichols et al. |
| 2002/0117541 A1 | 8/2002 | Biggar et al. |
| 2002/0125310 A1 | 9/2002 | Kursawe |
| 2002/0138447 A1 | 9/2002 | Van Leeuwen |
| 2002/0143647 A1 * | 10/2002 | Headings et al. .............. 705/26 |
| 2002/0161705 A1 | 10/2002 | Khan et al. |
| 2002/0198825 A1 | 12/2002 | Jentoft |
| 2003/0019924 A1 | 1/2003 | Mullins et al. |
| 2003/0075610 A1 | 4/2003 | Ong |
| 2003/0121969 A1 | 7/2003 | Wankmueller |
| 2003/0168510 A1 | 9/2003 | Allen |
| 2003/0197058 A1 | 10/2003 | Benkert et al. |
| 2003/0197059 A1 | 10/2003 | Tidball et al. |
| 2003/0205616 A1 | 11/2003 | Graves et al. |
| 2003/0212796 A1 | 11/2003 | Willard et al. |
| 2003/0218062 A1 | 11/2003 | Noriega et al. |
| 2003/0222136 A1 | 12/2003 | Bolle et al. |
| 2003/0222152 A1 | 12/2003 | Boley, Jr. |
| 2004/0007618 A1 | 1/2004 | Oram et al. |
| 2004/0011864 A1 | 1/2004 | Thompson et al. |
| 2004/0030647 A1 * | 2/2004 | Hansen et al. ................. 705/40 |
| 2004/0050928 A1 | 3/2004 | Bishop et al. |
| 2004/0056088 A1 | 3/2004 | Mullins et al. |
| 2004/0108376 A1 | 6/2004 | Witherspoon |
| 2004/0112952 A1 | 6/2004 | Algiene et al. |
| 2004/0112954 A1 | 6/2004 | Moreau et al. |
| 2004/0118914 A1 | 6/2004 | Smith et al. |
| 2004/0139000 A1 | 7/2004 | Amos |
| 2004/0153402 A1 | 8/2004 | Smith et al. |

| | | |
|---|---|---|
| 2004/0155101 A1 | 8/2004 | Royer et al. |
| 2004/0155103 A1 | 8/2004 | Klinefelter |
| 2004/0167821 A1 | 8/2004 | Baumgartner |
| 2004/0172362 A1 | 9/2004 | Hausmann et al. |
| 2004/0178262 A1 | 9/2004 | Takami |
| 2004/0195316 A1 | 10/2004 | Graves et al. |
| 2004/0199422 A1* | 10/2004 | Napier et al. ............... 705/14 |
| 2004/0211860 A1 | 10/2004 | Algiene |
| 2004/0215543 A1 | 10/2004 | Betz et al. |
| 2004/0226992 A1 | 11/2004 | Imanishi |
| 2004/0226995 A1 | 11/2004 | Smith |
| 2004/0236654 A1 | 11/2004 | Marlowe-Noren |
| 2004/0243496 A1 | 12/2004 | Kim et al. |
| 2005/0010483 A1* | 1/2005 | Ling ........................ 705/26 |
| 2005/0038714 A1 | 2/2005 | Bonet et al. |
| 2005/0065877 A1* | 3/2005 | Cleary et al. ............... 705/39 |
| 2005/0086139 A1 | 4/2005 | Blackman |
| 2005/0087594 A1 | 4/2005 | Phillips et al. |
| 2005/0091161 A1 | 4/2005 | Gustin et al. |
| 2005/0097017 A1 | 5/2005 | Hanratty |
| 2005/0108124 A1 | 5/2005 | Colleran et al. |
| 2005/0127158 A1 | 6/2005 | Figueras et al. |
| 2005/0131815 A1 | 6/2005 | Fung et al. |
| 2005/0144105 A1 | 6/2005 | Czyzewski |
| 2005/0154663 A1 | 7/2005 | Boyle |
| 2005/0173520 A1 | 8/2005 | Jaros |
| 2005/0182720 A1 | 8/2005 | Willard et al. |
| 2005/0211765 A1 | 9/2005 | Anthony et al. |
| 2005/0224574 A1 | 10/2005 | Maloney |
| 2005/0228749 A1 | 10/2005 | Lozano |
| 2006/0004659 A1* | 1/2006 | Hutchison et al. ............ 705/40 |

\* cited by examiner

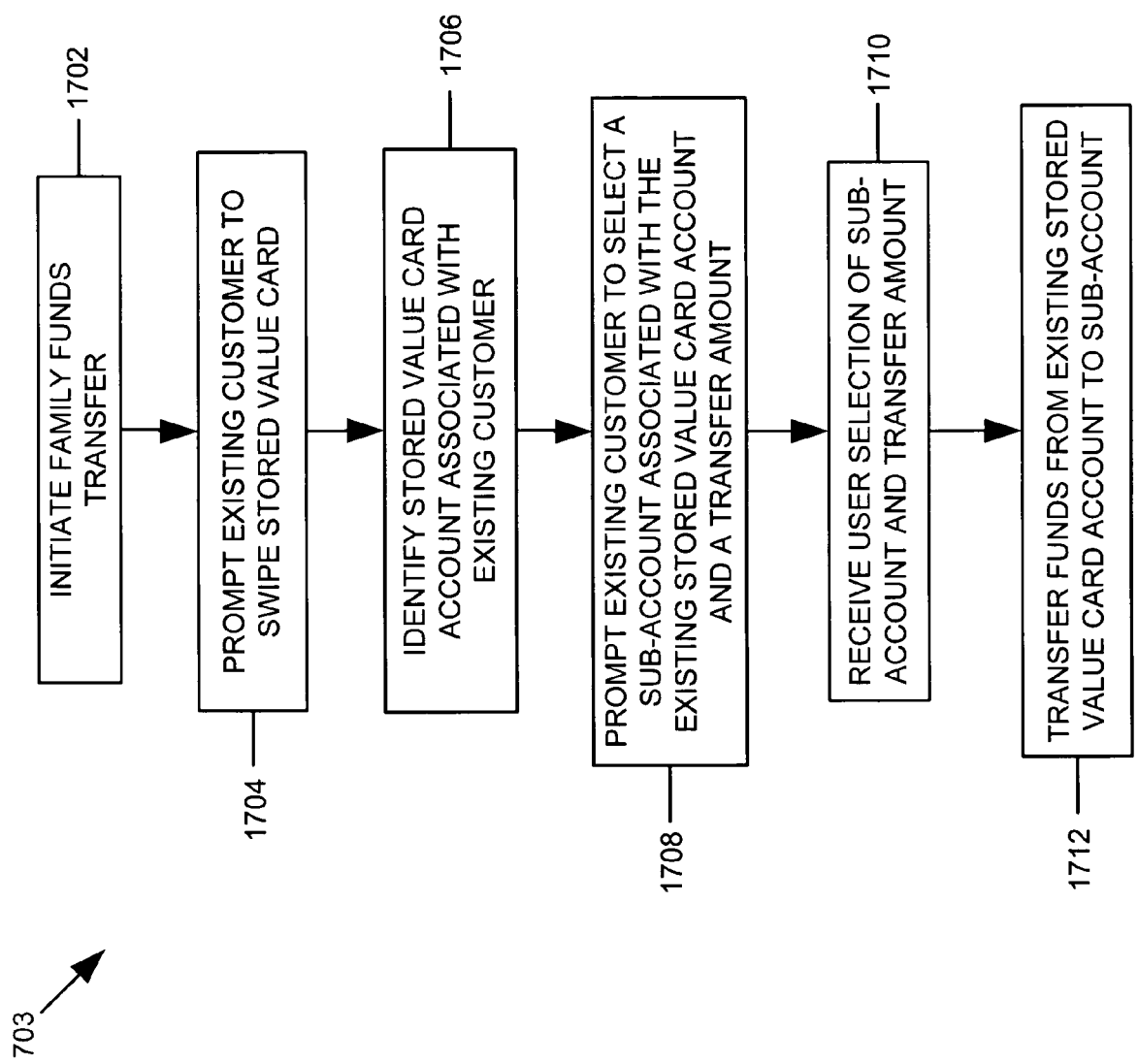

FAMILY STORED VALUE CARD PROGRAM

CROSS-REFERENCE TO RELATED APPLICATIONS

This application is a continuation-in-part application of copending U.S. patent application Ser. No. 10/685,277, entitled "System, Method and Apparatus for Providing Financial Services," filed on Oct. 14, 2003, which is related to U.S. patent application Ser. No. 10/645,949, entitled "System for Providing a Checkless Checking Account," filed on Aug. 22, 2003 and U.S. patent application Ser. No. 10/646,150, entitled "System and Method for Dynamically Managing a Financial Account," filed on Aug. 22, 2003, all of which are incorporated by reference in their entirety.

BACKGROUND

Throughout the years, a main focus of providing services to consumers has been convenience. It is quite clear to even the most simplistic marketing analyst that the more convenient you can make a service to the consumer, the more likely the consumer will partake in the service. It is on this foundation that the majority of Internet services are based.

The Internet is not always the final answer in providing convenience to the consumer. In some instances, consumers are simply reluctant to conduct business over the Internet due to a variety of reasons, such as fear of losing confidentiality, resistance to relying on modern technology and sometimes, just stubbornness. Thus, there has been, is and remains a need in the art for providing face to face, plain old ordinary customer service.

The banking and credit industry is particularly poised in this predicament. Consumers that are engaging in financial transactions or receiving financial services often times prefer to deal with an institution rather than the Internet. Thus, marketers are still challenged with increasing the convenience at which such services are offered.

One avenue that has been extensively explored for providing financial services is through merchants. Consumers typically are willing to trust a merchant that is offering a financial service. This is evident in the fact that nearly every department store offers a credit program to their customers.

Typically, merchants are limited to the types of financial services that they can provide. This limitation can be due to a variety of factors including the cost that the merchant must incur to provide the service, the technological complexities of providing the service, and the training required for the merchant's employees. However, anyone that has completed a marketing 101 class will agree that the more services a merchant can offer, the more foot traffic the merchant will generate and, thus, the higher probability the merchant will get a sale.

Thus, there is a need in the art for a solution that enables a merchant to provide multiple financial services to its customers, that is commercially feasible to the merchant, not overly complicated from a technological perspective, and that minimizes the training required for the merchant's employees.

SUMMARY

Various embodiments of a family stored value card program and associated systems, methods, computer programs, and merchant terminals are provided. One embodiment comprises a method for implementing a stored value card program. One such method comprises: identifying an existing stored value card account; and enabling a first customer associated with the existing stored value card account to establish a new stored value card account associated with a second customer, the new stored value card account linked to the first stored value card account.

Another such method comprises: enrolling a first customer in a stored value card program with a first stored value card account; and enrolling a second customer in the stored value card program with a second stored value card account, the second stored value card account comprising a secondary account associated with the first stored value card account.

Another embodiment is a merchant terminal for providing stored value card services. One such merchant terminal comprises: a card reader for reading data from a stored value card associated with an existing stored value card account of a first user; and a famil card enrollment module for enabling the first user associated with the existing stored value card account to establish a new stored value card account associated with a second customer.

BRIEF DESCRIPTION OF THE DRAWINGS

Other aspects, advantages and novel features of the invention will become more apparent from the following detailed description of exemplary embodiments of the invention when considered in conjunction with the following drawings.

FIG. 17 is a flow chart illustrating the architecture, operation, and/or functionality of an embodiment of the family card funds transfer module of FIG. 7.

DETAILED DESCRIPTION

In general, the present invention can be described as a novel system, method and apparatus for a merchant to conveniently provide a variety of financial services to a consumer. The exemplary embodiments described below are for illustrative purposes only and, a person skilled in the art will construe them broadly. It should be understood that the features and aspects of the present invention can be ported into a variety of systems and system/network configurations and any examples provided within this description are for illustrative purposes only. Referring now to the figures, in which like numerals refer to like elements throughout the several views, exemplary embodiments of the present invention are described.

Figure 1:
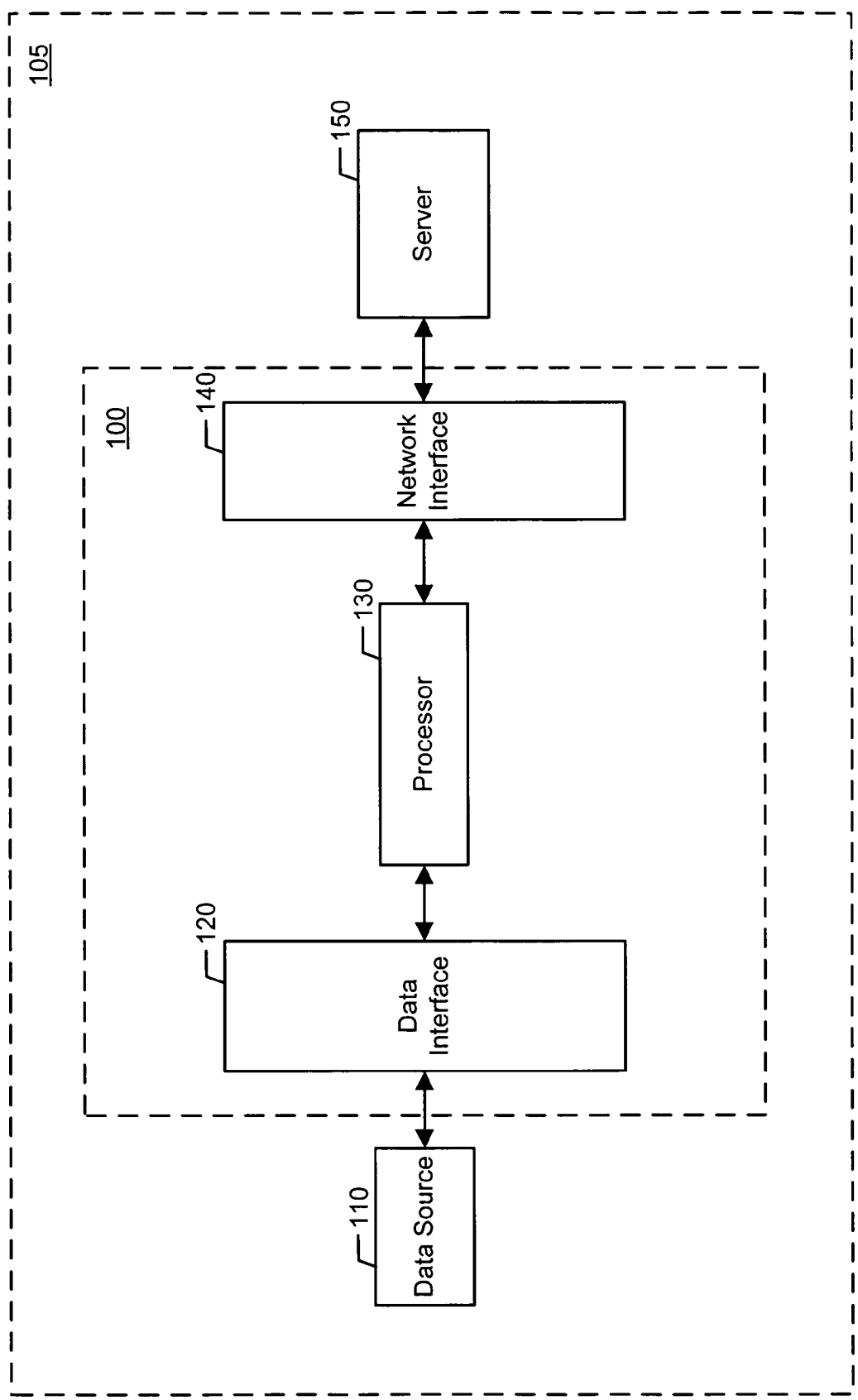
FIG. 1 is a diagram illustrating an exemplary embodiment of a terminal that facilitates the provision of a variety of financial services.

FIG. 1 is a diagram illustrating an exemplary embodiment of a terminal 100 that facilitates the provision of a variety of financial services. The terminal 100 is comprised of a processor 130, a data interface 120 and a network interface 140.

The data interface 120 is coupled both to the processor 130 and can interface to a data source 110. One function of the data interface 120 is to extract session data from the data source 110 and transfer the session data to the processor 130. Another function of the data interface 120 is transferring modified session data from the processor 130 to the data source 110. Thus, in some embodiments, the data interface 120 can transfer data bi-directionally. The data interface 120 may be any type of interface capable of extracting and/or writing to a data source 110. The data interface 120 may incorporate the hardware necessary to read/write to the data source 110 or may simply be an interface to a hardware device such as a bar code reader/writer, a magnetic reader/writer, a scanner, a templated scanner, a printer, a bio-metric identification device, a pass-through inlet/outlet, etc. Further, the data source 110 may consist of many different types of sources, including, but not limited to, a bar code, a magnetic-type card or magnetic storage device, scannable media, writable media, a fingerprint, a keyboard or keypad, a mouse, a light-pen, a touch pad, a display, or any other type of data device. The session data is data that may be utilized in a particular financial service transaction. The session data may be located on the data source 110, or alternatively, may be inputted manually. The session data may include, but is not limited to, name, date of birth, address, telephone number, social security number, verified government identification, direct deposit account (DDA) information and number, savings account information and number, credit history, debt to credit ratio, asset information, a type of financial service, a transaction amount, card account number, etc.

The network interface 140 is coupled to the processor 130 and interfaces to a server 150. One function of the network interface 140 is to provide session data to the server 150. Another function of the network interface 140 is obtaining validation from the server 150 and providing it to the processor 130. The server 150 validates all or a portion of the session data for a variety of different purposes depending on the particular financial service involved. The validation may include, but is not limited to, an approval for a financial service, a denial for a financial service, an available balance or fund verification, a credit worthiness verification, a billing address verification, etc.

The processor 130 is coupled to both the data interface 120 and the network interface 140. One function of the processor 130 is processing the session data and executing or initiating the provision of a plurality of financial services. The processor 130 receives the session data from the data interface 120 and requests a validation from the server 150, based at least in part on the session data, through the network interface 140. Further, the processor 130 provides or initiates the provision of a plurality of financial services and in some embodiments, is capable of updating the session data stored on the data source 110 based at least in part on the provision of the particular financial service. The plurality of financial services may include, but are not limited to, purchasing pre-paid cards, pre-paid card acceptance, credit card acceptance, debit card acceptance, check acceptance, point of sale purchase, cash back on point of sale purchase, transfers, card-to-card activity, bill payment, loyalty acceptance, etc.

FIG. 1 also illustrates the multi-functional terminal 100 within a system for providing financial services 105. The system 105 includes: the terminal 100, a server 150 and one or more data sources 110. In operation, the multi-functional terminal 100 is provided to a merchant for use in store operation. The terminal 100 is interfaced to and granted access to the server 150. The interface to the server 150 can be provided in a variety of fashions including, but not limited to, DSL, T1, broadband, wireless, telephonic and satellite connectivity. The multi-functional terminal 100 is available to merchant employees in providing the financial services to customers. Depending on the desired financial service, a customer obtains and/or presents a data source 110 to the merchant in conjunction with selecting a financial service to be provided.

Figure 2:
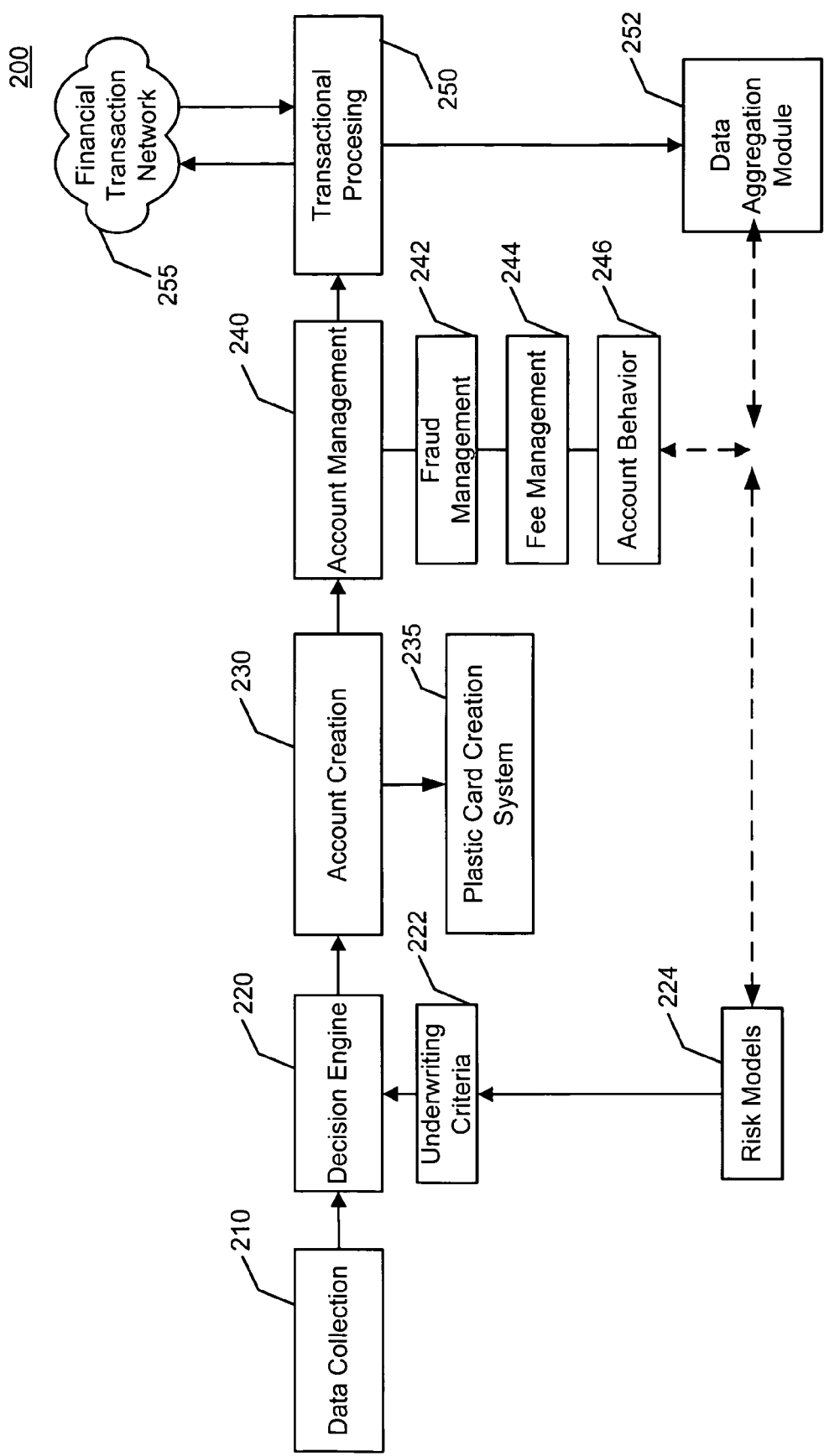
FIG. 2 is a flow diagram illustrating an overview of the steps and components that can be utilized in conjunction with implementing various embodiments of the present invention.

FIG. 2 is a flow diagram 200 illustrating an exemplary embodiment of the present invention. The details of the operation of the flow diagram 200 may vary among various embodiments of the present invention. In general, the illustrated embodiment includes five main functions or components: the data collection component 210, the decision engine 220, the account creation component 230, the account management component 240 and the transactional processing component 250. It should be understood that the structure illustrated in this figure is for discussion purposes only and the various functions or components of the present system could be combined or split in many manners.

The data collection component 210 collects data or information relevant to: opening a credit account (e.g., account formation data), determining if an applicant can qualify for an account, the type of account to be opened (e.g., account option data), and other miscellaneous data. The information collected with regards to the account formation data may include, but is not limited to, the applicant's name, date of birth, mailing, residential and business addresses, telephone numbers, social security number or verified government identification number, direct deposit account (DDA) information and account number, savings account information and account number, credit history, debt to credit ratio, assets, marital status, employment history, etc.

Further information regarding the account formation data, the account option data and the account types (as well as other types of data) can be found in the related applications identified above and which have been incorporated by reference into this specification. After the data collection component 210 receives the necessary or the minimum amount of information, the decision engine 220 can be begin processing.

The decision engine 220 receives raw or processed data from the data collection component 210 and, among other functions, integrates it with underwriting criteria 222 to determine if a customer qualifies for an account. The underwriting criteria 222 is initially determined using a collection of integrated algorithms, methods of work, business processes, and initial risk modules 224 that enable the analysis, issuance, distribution, and monitoring of an integrated credit product. The initial risk models 224 are compiled from a variety of different sources that vary by issuer. One skilled in the art is familiar with the type of information that is associated with them. In addition to determining if a customer qualifies for an account, the decision engine system 220 also determines if a customer qualifies for any applicable account option data selected in the data collection system 210. For example, if a customer selected an overdraft option in the account option data, the decision engine 220 would determine if the customer qualified for that option and, if qualified, the amount of the overdraft limit. The decision engine 220 uses the account formation data to qualify the customer and perform a risk management processes. The customer is subjected to underwriting criteria 222 to determine qualification and some additional data or documents may be required for the process.

Once a customer is qualified, the account creation component 230 proceeds to open an account. The account creation component 230 may perform different functions depending upon the account option data. Preferably, the account creation component 230 operates to create an account for the customer in a manner that is in compliance with all applicable local, state and federal laws. During the account creation, the account creation component 230 may utilize various procedures to support issuer risk mitigation requirements. The account creation component 230 also includes a plastic card creation component 235 that operates to generate a permanent card for the customer.

The procedures performed by the account creation component 230 may vary depending on the type of account being created. In the examples provided in the incorporated references identified above, the three account types include the instant issue card, the basic card and the basic card with overdraft protection. Other functions that may be performed by the account creation component 230 include the activation of the account the issuance of cards. The details of these functions are more specifically described in the incorporated references.

The account management component 240 manages the customer account by utilizing controllers to enable and disable certain functions and privileges of the account based on various factors. Some of the factors can include account risks and customer behaviors. In one embodiment, the account management component 240 can include the functions of fraud management model 242, fee management model 244 and account behavior model 246. The fraud management model 242 can utilize the operation of the account behavior model 246 to determine if any fraudulent activities are associated with the account. If any fraudulent activities are detected, the account management component 240 can be notified by the fraud management model 242 to suspend the account. The fee management model 244 determines and assesses any applicable fees to be charged against the account. For example, if the account is overdue, a late fee would be assessed to the account. In the various embodiments, additional fees can be assessed against the accounts. For instance, a one time fee may be assessed for the creation of the account or for the creation of certain accounts, such as accounts having an overdraft component 234. In addition, the account may include a fixed number of transactions or a fixed number of transactions per fixed period (e.g., per month). Once the fixed number of transactions is exceeded, additional transactions can be assessed a transaction fee. In another embodiment, a monthly fee may be assessed on the account.

The account behavior model 246 examines account activity and looks for patterns in the account activity to determine possible actions to be taken (e.g., intervention to stop fraud). For example, if an account appeared to have sporadic spending or if the stored value became zero, the account could be turned off temporarily to ascertain if the account is being defrauded. The transactional processing component 250 processes and monitors the day to day transactions between the account and the financial transaction network 255. The transactional processing component 250 is then compiled by the data aggregation module 252.

The data aggregation module 252 may work on data related to the entire population of account holders, groups of populations based on factors such as age, occupation, areas of domicile etc. or even individuals. The data aggregation module 252 provides processed outputs to the risk models 224 and the account behavior 246 model.

A key aspect of the present invention is found in the operation of the account management component 240. The account management component 240 of the present invention enables the dynamic management and alteration of the financial account based on real-time and current information. Two controlling factors are applied to the account management component 240. These controlling factors include the output of risk models 242 that have been run on the initial underwriting criteria collected by the data collection component 210, as well as the output of the data aggregation module 252.

The data aggregation module 252 refines and updates, preferably on a real-time basis, the various current trends of the accounts being managed. This information is then fed into the risk models 224 which determine new underwriting criteria 222, and the account behavior 246 model. The data aggregation module 252 can feed information into the risk models 224 and the account behavior 246 model at periodic intervals, continuously, autonomously, on request, or on other bases. The account behavior model 246 can operate to alter the parameters of the operation of the credit account. The account behavior model 246 can base these alterations on the input from the aggregation module 252 and/or the risk models 224. Thus, in operation, the data aggregation module 252 may identify trends for a particular subset of the population. This information in turn can be used by the risk models 224 to identify certain risks associated with the particular subset or related subsets of the population. This information, as well as the information directly provided from the data aggregation module 252 can serve as the basis for altering the parameters of the credit account. As a particular example, suppose that the data aggregation module 252 identifies an increase in transactions by customers identified as working in the airline sector and the risk models 224 indicate a decline in job stability in the transportation industry. The account behavior model 246 may utilize this information to decrease the lines of credit provided to customers working in the airline sector, increase fees associated with their accounts, provide a higher level of scrutiny on approvals of purchases, lock the account from further purchases, or the like. From a fraud perspective, the account behavior model can receive information from the data aggregation module 252 that may be an indication of fraudulent behavior. The account behavior module 246 can then take actions to limit or alleviate the risk of fraud.

Similarly, the risk models 224 can receive input from the data aggregation module 252 and/or the account behavior model 246. The information fed to the risk models 224 is used as the basis for generating new underwriting criteria for qualifying new individuals for accounts. The new underwriting criterion provides more accurate real-time criteria that are not otherwise available when using underwriting criteria that has only been created at the initial stages of qualification.

Figure 3:
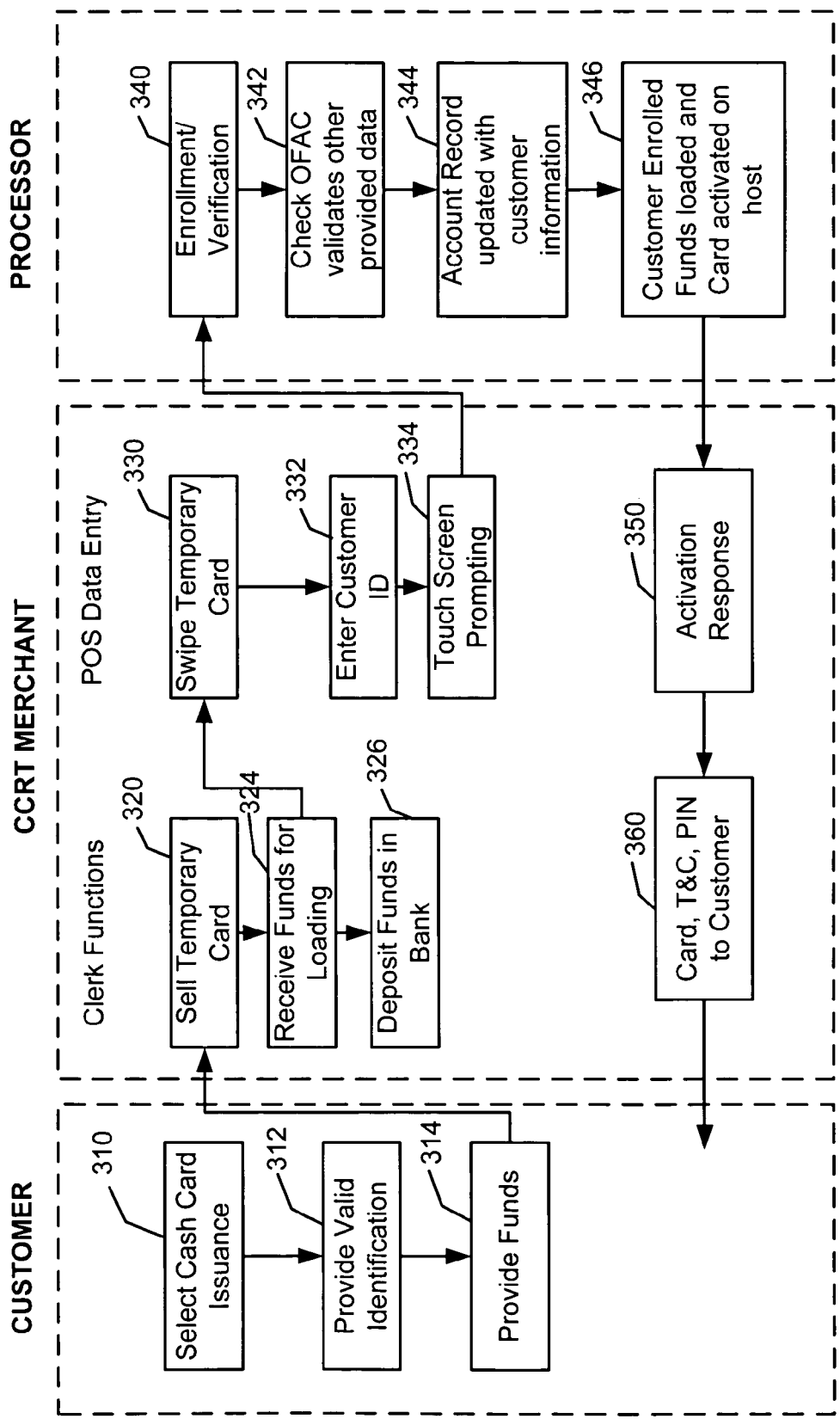
FIG. 3 is a flow diagram illustrating the processes involved in providing the exemplary financial service of issuing a cash card to a customer through the use of the multi-functional terminal of the present invention.

FIG. 3 is a flow diagram illustrating the processes involved in providing the financial service of issuing a cash card to a customer through the use of the multi-function terminal 100 of the present invention 300. Initially a customer approaches a merchant that has a multi-function terminal. The customer selects, or with the help of the merchant, selects the financial option of the issuance of a cash card 310. The customer is then prompted to provide valid identification 312 and funding for the cash card 314.

The merchant's clerk working with the customer initiates the sell of a temporary card 320. The clerk then receives the funding from the customer that will be used for loading value into the cash card 324. Independently the merchant deposits the funds in a banking institution, transfers the funds to an appropriate account or issues a transaction against a credit card 326. In addition, the clerk swipes the temporary card through the terminal 330. The terminal 100 reads the magnetic strip on the back of the temporary card and extracts an identification number for the card. The clerk then enters the identification of the customer 332. The identification can be obtained from the valid identification presented by the customer or through some other means. The clerk then follows one or more steps prompted by the multi-functional terminal. In the illustrated embodiment, this is done through a touch screen on the multi-function terminal 334.

The information collected at this point in the process is passed to a processor that first operates to enroll the customer and verify the information received from the customer 340. The processor then conducts an OFAC check and validates other data provided by the customer 342. An account record is then either created, or updated if this is a repeat customer, with the customer information 344. The processor then operates to enroll the customer, load the provided funds onto a card and activate the card in conjunction with a host or server managing the processor 346.

If the customer is approved, an activation response is provided to the multi-functional terminal 350 and a card, terms and conditions and a PIN is provided to the customer 360. At this point the customer is then able to use the temporary card. In some embodiments, a permanent card will then be created and mailed to the customer.

Figure 4:
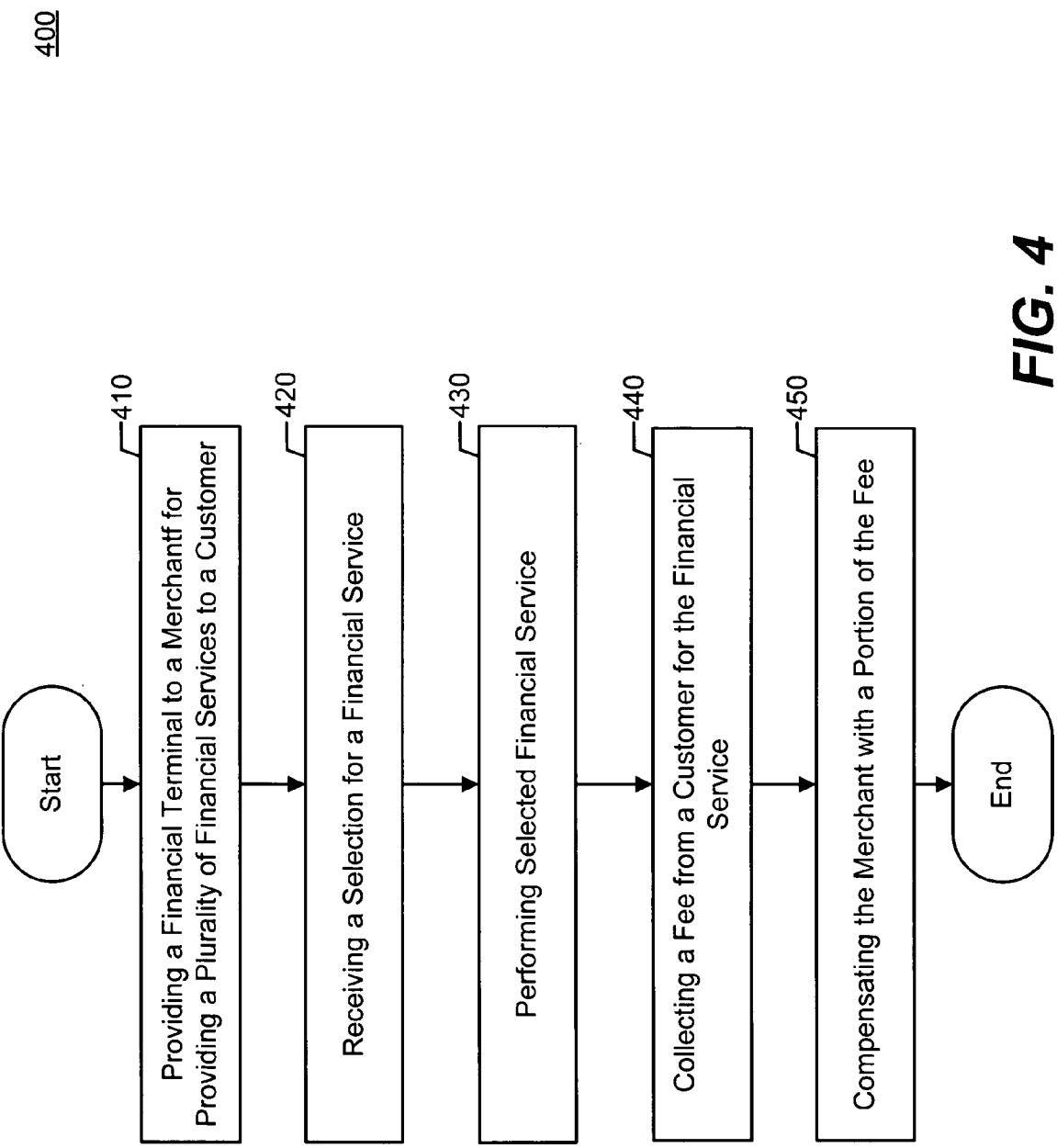
FIG. 4 is a flow diagram illustrating the operation of an exemplary embodiment of the present invention.

FIG. 4 is a flow diagram illustrating the operation of an exemplary embodiment of the present invention. One aspect of the present invention is providing an entire suite of financial services that are available to a customer, or a customer working with a merchant 400. The first step in providing the suite of financial services 400 is providing a multi-functional terminal to a merchant 410. In conjunction with this, the multi-functional terminal can be integrated into the merchant's communication infrastructure as well as being connected to the server 150 that operates in conjunction with the terminal 100. The multi-functional terminal 100 is operable to provide the suite of financial services to a customer.

Once the multi-functional terminal 100 or terminals are installed and operational at the merchant location, the multi-functional terminal 100 can be access by a customer and/or a merchant to initiate the provision of a financial service selected from the suite of financial services available.

One of the overall purposes of the present invention is to allow customers to have instant access to a suite of financial services at a variety of locations convenient to the customer. Thus, the service provider of the financial services equips multiple merchants with the terminal 100 equipment.

The suite of financial services can be accessed from the multi-functional terminal 100 in a variety of manners. Thus, in an exemplary embodiment, a terminal 100 gives a service provider the ability to identify and process a customer requesting a financial service at a retail merchant point of sale. The terminal 100 operating in conjunction with the server 150 and other resources insures compliance with identification and qualification requirements established by competent authorities and/or the service provider. The merchant makes the terminal 100 available for use by a customer or the merchant operates the terminal 100 on behalf of the customer.

The financial service can include one of several financial services, such as purchasing a stored-value card, transferring of funds, wiring funds, obtaining cash in an ATM fashion, purchasing a pre-paid credit-type card, purchasing a pre-paid telecom card, stamps, etc. at the terminal. One key aspect of the present invention is that a single terminal 100 can provide any and all of these financial services as well as other services.

In one embodiment a menu of services available can be displayed on a screen and selected by a customer and/or merchant. In another embodiment, the customer may swipe a card through the card reader of the terminal 100 and after identifying the customer or card identification, the terminal 100 can indicate the financial services available. In addition, it should be noted that the terminal 100 can operate in conjunction with the server 150 to determine the financial services available to the customer. Regardless of the method of indicating the services available or the method employed for selecting one of the suite of services, the terminal 100 receives a selection for a financial service 420. The selection is made from the plurality of financial services available to the customer.

The selected financial service is performed 430. This process can vary greatly depending on the selected financial service. However, in most situations, the customer is prompted to provide additional information that is entered into the multi-functional terminal 100 in one of the various previous manners disclosed. Once the multi-functional terminal 100 has sufficient information, the multi-function terminal 100 interacts with the server to determine if the financial service can be provided, if the customer qualifies and to verify the information is correct. This process may involve requesting additional information from the customer and/or the merchant. Ultimately, the financial service is provided to the customer.

A fee is collected from the customer for the provision of the financial service 440. As has been described, this fee can be collected in a variety of manners including cash, credit cards, bank transfers or the like.

A key aspect of the present invention is the step of compensating the merchant with a portion of the fee collected from the customer 450. This varies from the current state of the art. Traditionally, merchants have paid a fee to have terminal equipment installed on their premises and/or paid a fee for certain transactions. The system implementation of the present invention utilizes various means for compensating the merchant for housing and operating the equipment at the merchant's location. In one embodiment, the merchant may simply be given a flat fee for each terminal 100. In another embodiment, the merchant may be paid a fee based on the number of terminals 100 and the number of transactions provided using the terminals 100. In yet another embodiment, the merchant may be compensated based solely on the number of transactions. In yet another embodiment, the merchant may be compensated based on a percentage value of the transactions. Those skilled in the art will appreciate that any of these compensation methods, as well as a combination of one or more of these methods maybe utilized and the present invention is not limited to any particular configuration.

The Suite of Services: The present invention can be utilized to provide a suite of financial services to a customer at a variety of merchant locations. The general descriptions of these financial services are provided below.

Stored-Value Card: For the financial service of purchasing a stored-value card, the customer purchases a pre-paid or stored-value magnetic-type card (the data source 110), from the merchant. The detailed components for this financial service were described in conjunction with FIG. 3. The overall operation of this financial service enables the merchant to initiate and issue a stored-value card. The merchant can accept payment for the card in a variety of manners including cash, credit card, money transfer, check, etc. The merchant may supply and swipe the card through a magnetic card reader (the data interface 120), interfaced to the terminal 100. This process allows the terminal 100 to capture the account number of the card. The merchant may then enter a value for the card into the terminal 100 through the data interface 120. As previously described, this information can be provided to the terminal 100 in a variety of manners including the use of a keyboard, scanner, magnetic card reader or the like. In one embodiment, the merchant may acquire certain additional information from the customer, such as the customer's name, date of birth, social security number, DDA number, etc.). The merchant may then enter this information into the data interface 120 of terminal 100. Although this aspect of the invention is being described as a customer and merchant performing certain tasks, it should be understood that either of the participants could perform the tasks and some of the tasks could even be automated.

Once the merchant has collected all of the information, or even during the information collection process, all or portions of the information are provided to the server 150 through the network interface 140. The server processes the information in a manner that is familiar to those skilled in the art. The incorporated references provide further information regarding this process. The merchant then waits for the terminal 100 to receive authorization from the server 150.

The funds for the stored-value card can be provided by the customer in a variety of manners. In one embodiment, the stored-value card may be funded directly from the customers direct deposit account (DDA), thus the limit of the pre-paid or stored value card is the amount taken from the account and placed on the card. In another embodiment, the stored-value card can be funded based on a credit as authorized by the service provider, thus the limit of the card is limited by the amount of credit authorized. The stored-value card can also be funded by a direct cash transaction at the terminal 100. Thus, the value of the stored-value card can be selected by the customer or merchant and as long as funds are available.

The authorization of the stored-value card can be based on a number of factors, including, but not limited to, credit worthiness, credit history, credit score, balances in customer accounts, etc. Once an authorization has occurred, the card is activated and a stored value or credit limit is associated with the card. In one embodiment, the activation process may include writing information out to the data source 110, in this case the stored-value card. For instance, the value associated with the stored-value card, an expiration date, an authorized user name, PIN code, terminal 100 and/or merchant at which the card was activated, date of activation, or a variety of other information could be stored on the stored-value card. The customer may then make purchases from the merchant using the pre-paid or stored-value card.

In addition, once a financial service is provided, such as using the stored-value card, the terminal 100 can operate to update the session data after performing a financial service and sends the updated data to the data source 110. The customer can then use the terminal 100 to view activity data, history data or other data associated with the data source 110.

The process for issuing a stored-value card is also applicable to the purchasing a pre-paid credit-type card as well as a pre-paid telecom card.

Transferring of Funds: For the financial service of conducting a fund transfer, the customer initiates the transfer by selecting the appropriate feature from the terminal 100. The present invention can be used to transfer funds from one account into another account, from a stored-value card to an account, or from an account to a stored-value card. For transferring funds from one card to another, the customer can simply swipe the card through the card reader of the terminal 100 and select an option to transfer the balance, or a portion thereof to another card. The balance can be transferred to another card held by the customer or to another card not even owned by the customer. In this case, the customer will be required to enter a card identification number, account number and/or customer identification information into the terminal 100. The server 150 operates to receive the fund transfer request. If the transfer is a card to card transfer, the server 150 can communicate with the terminal 100 and instruct the customer to swipe the destination card or enter the necessary information to identify the destination for the transfer. If the transfer is to be made to a card not in the customer's possession, the server 150 can receive and maintain information regarding the transfer. Once the system is accessed by the destination card or a card associated with a customer or account destined to receive the transfer, the server 150 can initiate the completion of the transfer. If the funds are destined for an account, the server 150 can transfer the funds directly into the account once the appropriate information is entered. If the transfer request is to transfer funds from an account onto the card, the process is similar to that described in conjunction with the stored-value card financial service.

Wiring Funds: For the financial service of conducting a wiring fund transfer, the customer initiates the transfer by selecting the appropriate feature from the terminal 100. Similar to the funding options for the stored-value card, the customer can utilize the same options for funding the wiring transfer. The terminal 100 collects the necessary information by prompting the customer for the information. In the alternative, the server 150 can cause the terminal 150 to prompt for specific information. In either case or using a combination of both, the information is collected and transferred to the server. The server then actuates the wire transfer.

Cash—back: For the financial service of providing access to cash, the customer initiates the service by selecting the appropriate feature from the terminal 100. The funds to support cash access can be based on a credit card, money transfer, check, etc. The terminal 100 collects the necessary information by prompting the customer for the information. In the alternative, the server 150 can cause the terminal 150 to prompt for specific information. In either case or using a combination of both, the information is collected and transferred to the server. The server 150 then approves the financial service and gives in indication to the terminal 100. This same approach can be applied in the purchase of stamps.

Check Acceptance: The terminal 100 can also be used to authorize or verify payments by check. The check can be scanned at the terminal 100, and based on the account information, the server 150 can begin to process approval for the payment. The server 150 and or terminal 100 can request additional information from the customer to complete the financial service and the customer can enter that information at the terminal 100.

Bill Payment: The terminal 100 can be utilized by a customer 150 to pay bills. In operation, the customer enters information to identify the recipient of the bill, along with the amount, source of funds for making the payment, and the like. The terminal 100 and/or server 150 may interact with the customer to obtain additional information. The source of funds can be any of a variety of sources, or a combination of one or more sources, including but not limited to, a stored-value card, banking account, cash, check or the like.

Loyalty awards: The present invention also anticipates providing a loyalty awards program. In one embodiment, the merchant charges a fee for the financial service, a portion of which is supplied to the service provider. In another embodiment, the terminal 100 automatically assesses and extracts a fee for a give financial service and apportions the fee appropriately to the merchant and/or the service provider.

Figure 5:
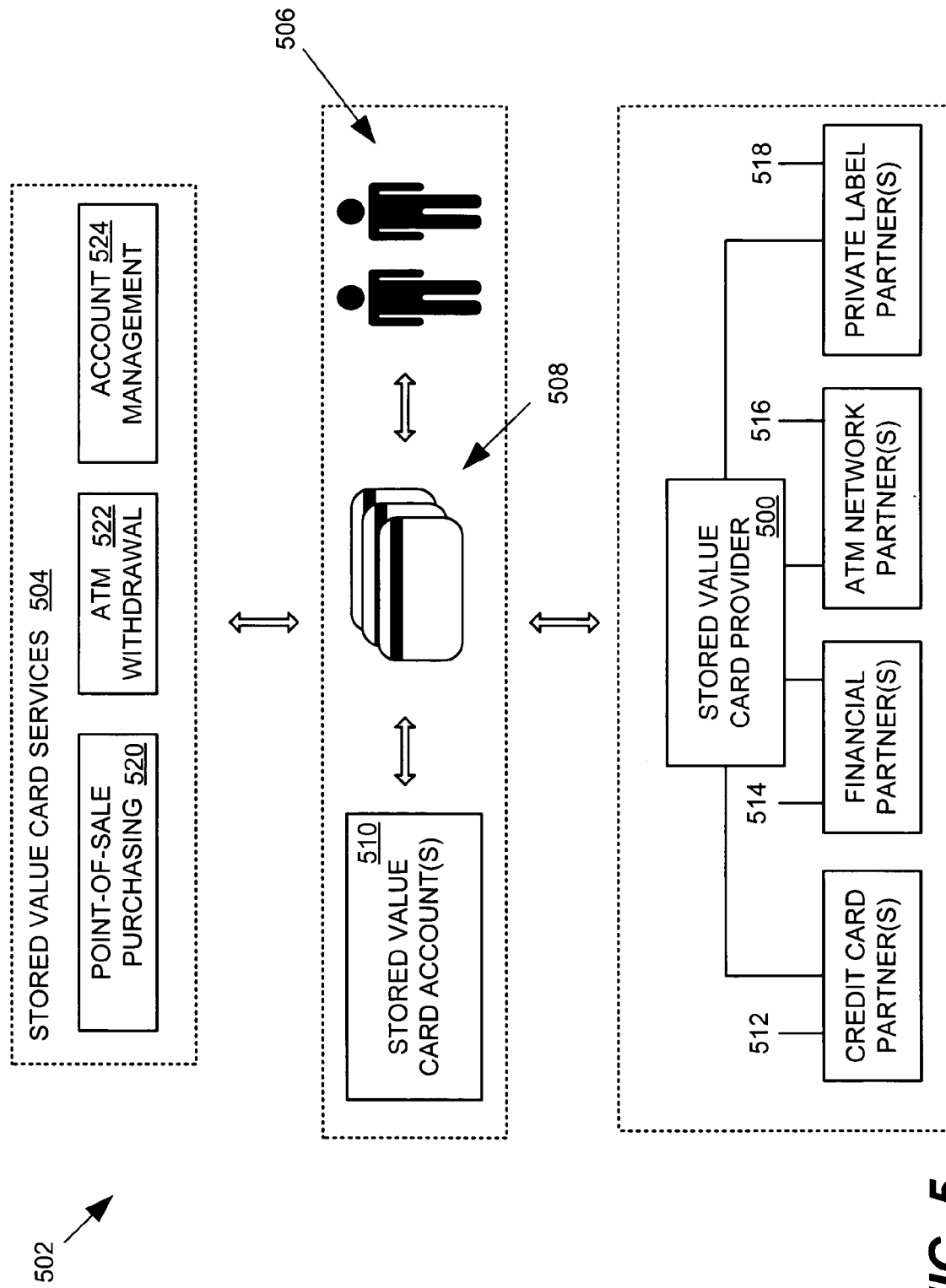
FIG. 5 is a block diagram illustrating an exemplary embodiment of a stored value card program.

Referring to FIGS. 5–17, various embodiments of an exemplary stored value card program—and associated systems, methods, computer programs, terminals, etc.—will be described. FIG. 5 illustrates an embodiment of a financial services environment 502 in which a family stored value card program may be implemented. As illustrated in FIG. 5, a stored value card provider 500 provides various stored value card services 504 to customers 506, such as point-of-sale purchasing 520, ATM withdrawals 522, and account management 524, to name a few. Customers 506 access a money balance using a stored value card 508. The money balance may be stored directly on the card 508, or other credit token, or maintained in a stored valued card account 510 maintained by stored value card provider 500 or some other entity, such as a card issuer, host, etc. Stored value cards 508 may be used at ATM locations to withdraw money against the balance. Stored value cards may also be used to make purchases against the balance at the point-of-sale.

In this regard, stored value card provider 500 may have business relationships, partnerships, etc. with various entities that assist in the provision of stored value card services 504. Although the relationships are not necessary to provide stored value card services 504, it may be advantageous to partner rather than create independent financial solutions for customers 506. For instance, as illustrated in the embodiment of FIG. 5, stored value card provider 500 may have relationships with credit card partner(s) 512 (e.g., Visa®, MasterCard®, American Express®, etc.) to support the provision of point-of-sale purchasing 524. Stored value card provider 500 may also have relationships with ATM network partner(s) 516 (e.g., Maestro®, Cirrus®, Plus®, Interlink®, etc.) to support the provision of ATM services, such as ATM withdrawals 522. Stored value card provider 500 may also arrange relationships with other financial institutions (e.g., financial partners 514) and other private label partner(s) 518 as desired.

Figure 6:
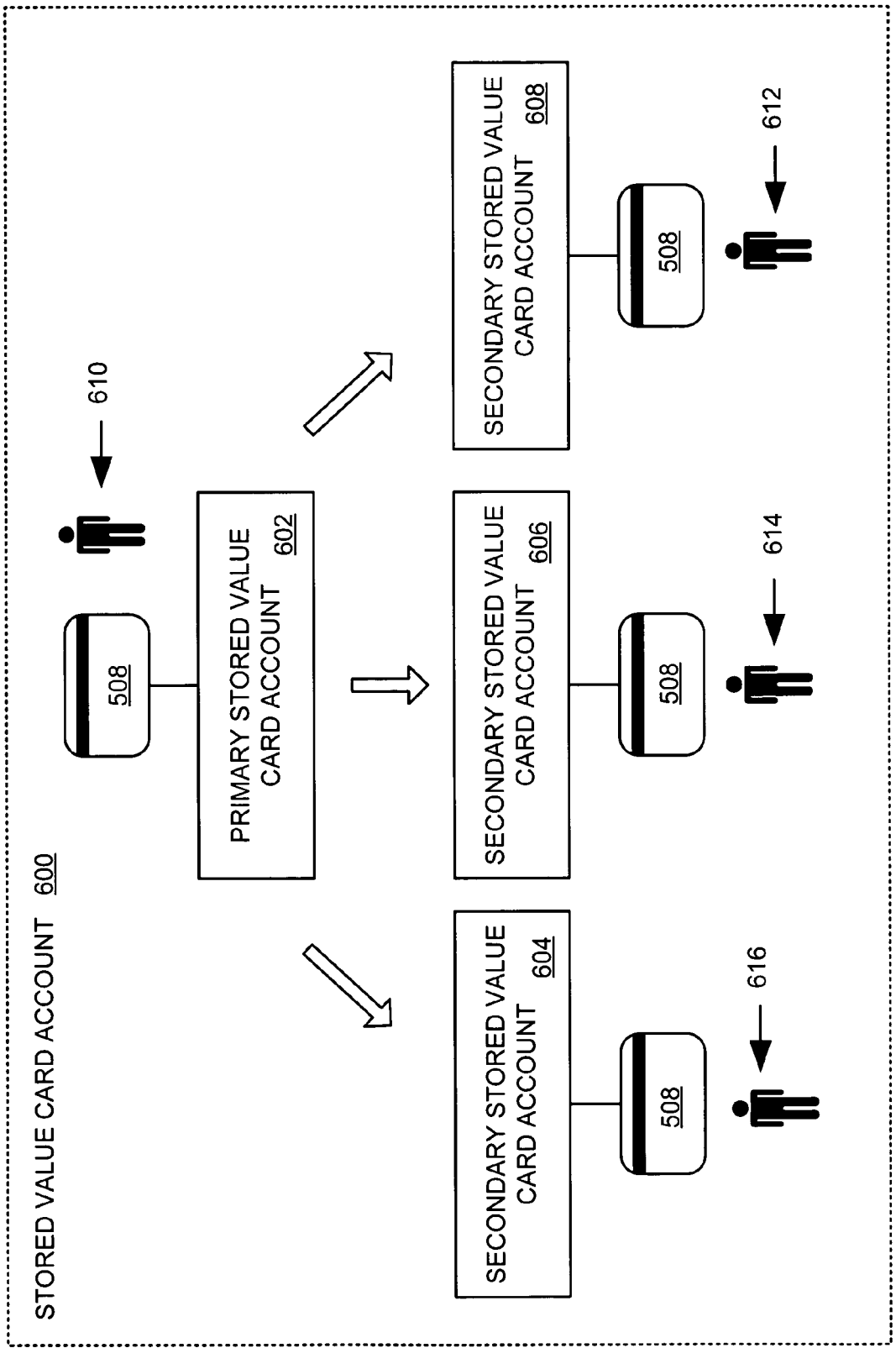
FIG. 6 is a block diagram illustrating an embodiment of a family stored value card account.

FIG. 6 illustrates an exemplary embodiment of a stored value card account 600 which may be used to support a family stored value card program. In general, the family stored value card program provides stored value card account(s) 600 which comprise a "family" of stored value card accounts 510. As best illustrated in FIG. 6, a stored value card account 600 comprises a primary stored value card account 602 (issued to one customer) and one or more secondary stored value card accounts 604 (issued to other customers). Secondary stored value card account(s) 604 are linked to primary stored value card account 602. For instance, a primary stored value card account 602 may be issued to a customer 610. Provider 500 may issue multiple stored value cards 508 to customer 610, each of which are associated with primary stored value card account 602. In other words, these cards 508 may be used to access a money balance in primary stored value card account 602 via services 504 (FIG. 5). The family stored value card program enables customer 610 to enroll additional customer(s) (e.g., 612, 614, 616) in the family program by creating secondary stored value card accounts (e.g., 608, 606, 604, respectively) which are linked to primary stored value card account 602.

For example, customer 610 may desire to provide a stored value card to family members, relatives, friends, etc. The family stored value card program enables customer 610 to enroll the desired individual(s) by creating sub-accounts which have their own balance maintained in a secondary stored value card account 604, 606 or 608. Stored value card provider 500 links the two accounts so that they may be appropriately managed as a family of stored value card accounts. Thus, it should be appreciated that, although secondary stored value card accounts have their own money balance, they may be collectively managed by stored value card provider 500. For instance, the master account (i.e., stored value card account 600) may be managed, controlled, etc. by the primary account holder, while customers 612, 614 and 616 are able to access a money balance on secondary accounts 608, 606 and 604 via services 504. In this manner, customer 610 and/or provider 500 may control various aspects of secondary stored value card accounts 604, 606 or 608. The primary account holder may control the available funds on the sub-accounts. The primary account holder may control loads, reloads, etc. to the sub-accounts, as well as other card features, such as velocity limits, withdrawal limits, etc. By linking the primary and sub-accounts, provider 500 may also control various aspects of the family of cards. For instance, provider 500 may define and enforce an aggregate balance limit for all cards, withdrawal limits, velocity limits, etc.

The primary account holder (i.e., customer 610) may create, enroll, or otherwise initiate the provision of the secondary stored value card accounts 604, 606 or 608 in a number of ways. In one embodiment, the primary account holder may manually enroll individual(s) in the family stored value card program at a customer service location associated with provider 500 or over the telephone. The enrollment process may also be automated. For instance, the enrollment functionality may be embodied within a customer service web site or an interactive voice response (IVR) system. In alternative embodiments, the enrollment functionality may be located in terminal 100 described above.

Figure 7:
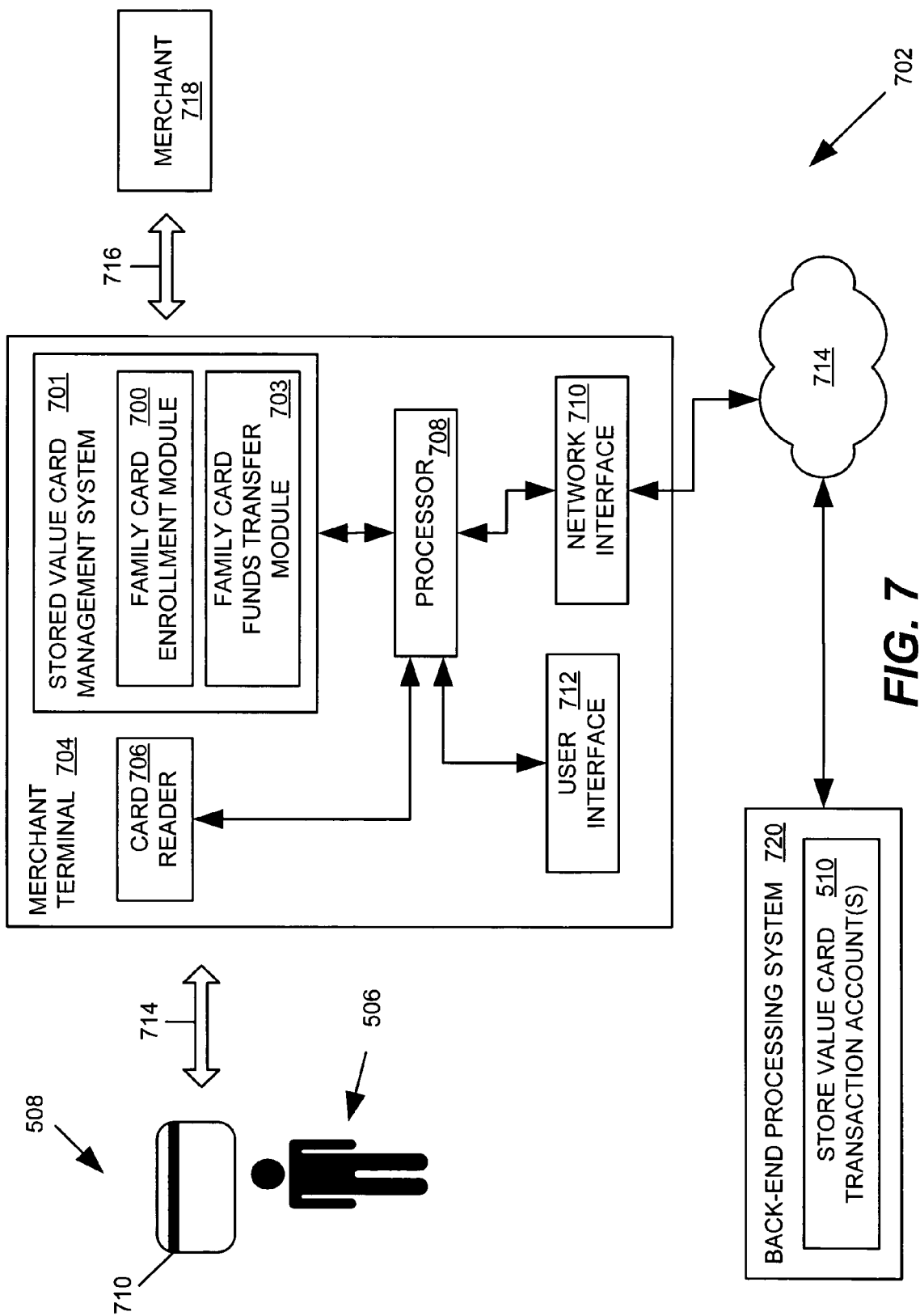
FIG. 7 is a block diagram illustrating a system for providing stored value card services.

As mentioned above, a terminal 100 may be installed at a merchant location and accessed by a customer, merchant, etc. to initiate the provision of various financial services. In this regard, FIG. 7 illustrates a block diagram of a system 702 that supports the provision of various stored value card services. As illustrated in FIG. 7, system 702 comprises one or more merchant terminals 704 that provide the stored value card services to customer(s) 506. Merchant terminal(s) 704 may be located at a merchant site where point-of-sale transactions occur. Therefore, as represented by arrow 716, a merchant terminal 704 may be associated with one or more merchant(s) 718. Although not illustrated in FIG. 7, it should be appreciated that merchant terminal(s) 704 may be maintained by a merchant representative. Furthermore, it should be appreciated that the merchant representative may have access to cash via, for example, a typical cash register. In this manner, merchant terminal(s) 704 may be used in conjunction with—or in certain embodiments without—the merchant representative and cash register.

In the embodiment illustrated in FIG. 7, merchant terminal 704 comprises a card reader 706, a stored value card management system 701 (which includes a family enrollment module 700 and a family card funds transfer module 703), a processor 708, a user interface 712, and a network interface 710. In general, processor 708 controls the functional operation of various (although not necessarily all) aspects of card reader 706, user interface 712, network interface device 710, and stored value card management system 701. Card reader 706 comprises a hardware device configured to read stored value cards 508. As illustrated in FIG. 7, stored value card 508 may comprise a magnetic strip 710 which may be read by card reader 706. It should be appreciated, however, that card reader 706 may comprise other types of devices depending on the manner in which data is stored on stored value card 508.

User interface 712 comprises a display functionality that enables merchant terminal 704 to interactively communicate with customer(s) 506. As described in more detail below, user interface 712 may provide a customer service menu by which customer(s) 506 may select various types of services, input various types of information, etc. (including enrolling new customers 612, 614 and 616 into the family stored value card program as sub-accounts).

Network interface 710 comprises any device configured to communicate with a remote computer (e.g., issuing host, provider 500, etc.) via a communications network 715. In this regard, it should be appreciated that various aspects of the services provided by merchant terminal 704 may be provisioned by a back-end processing system 720 associated with provider 500. Back-end processing system 720 may include one or more service providers, hosts, financial institutions, network node, network switch, etc. Therefore, it should be appreciated that back-end processing system 720 may include an automated clearing house component for exchanging electronic transactions among participating depository institutions. Back-end processing system 720 may include various other components for exchanging funds between accounts, reconciling accounts, settling accounts, etc. As illustrated in the embodiment of FIG. 7, back-end processing system 720 maintains one or more stored value card transaction accounts 510 and/or 600.

As further illustrated in FIG. 7, merchant terminal 704 includes a stored value card management system 701. Stored value card management system 701 may include various logical functions, software components, etc. for controlling the provision of financial services. Many of these operations, features, etc. are described above with respect to terminal 100. Stored value card management system 701 may include a family card enrollment module 700 and a family card funds transfer module 703. Modules 700 and 703 are described below in detail. In general, however, family card enrollment module 700 supports a customer service functionality for enrolling new customers in the family stored value card program. The customer service functionality enables a primary account holder to add secondary stored value card accounts to the primary account 602. Funds transfer module 703 enables the primary account holder to transfer funds (e.g., load, reload, deposit cash, etc.) to secondary stored value card accounts 604, 606 or 608 at merchant terminal 704.

Figure 8:
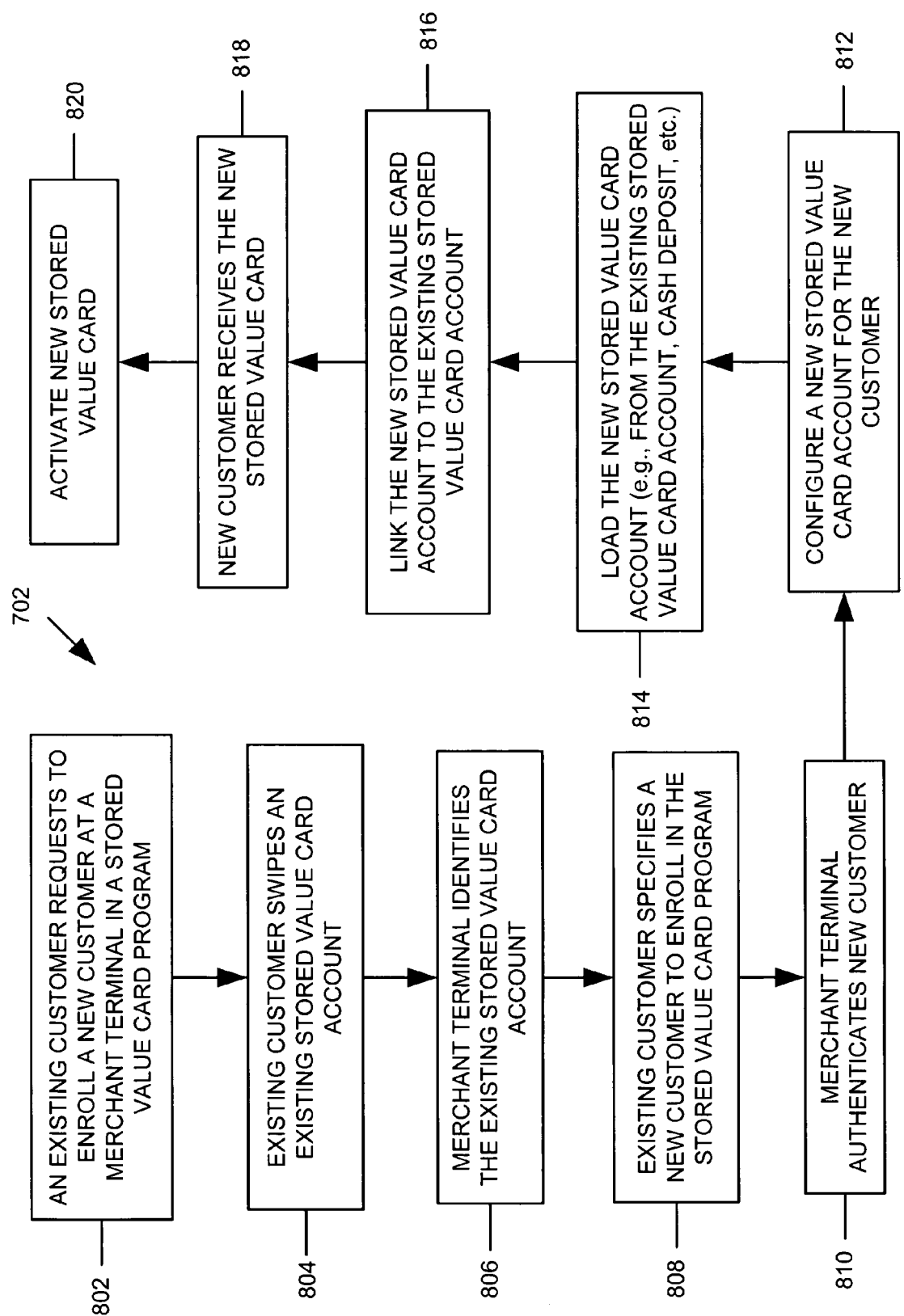
FIG. 8 is a flow chart illustrating a method for implementing a stored value card program in the system of FIG. 7.
Figure 9:
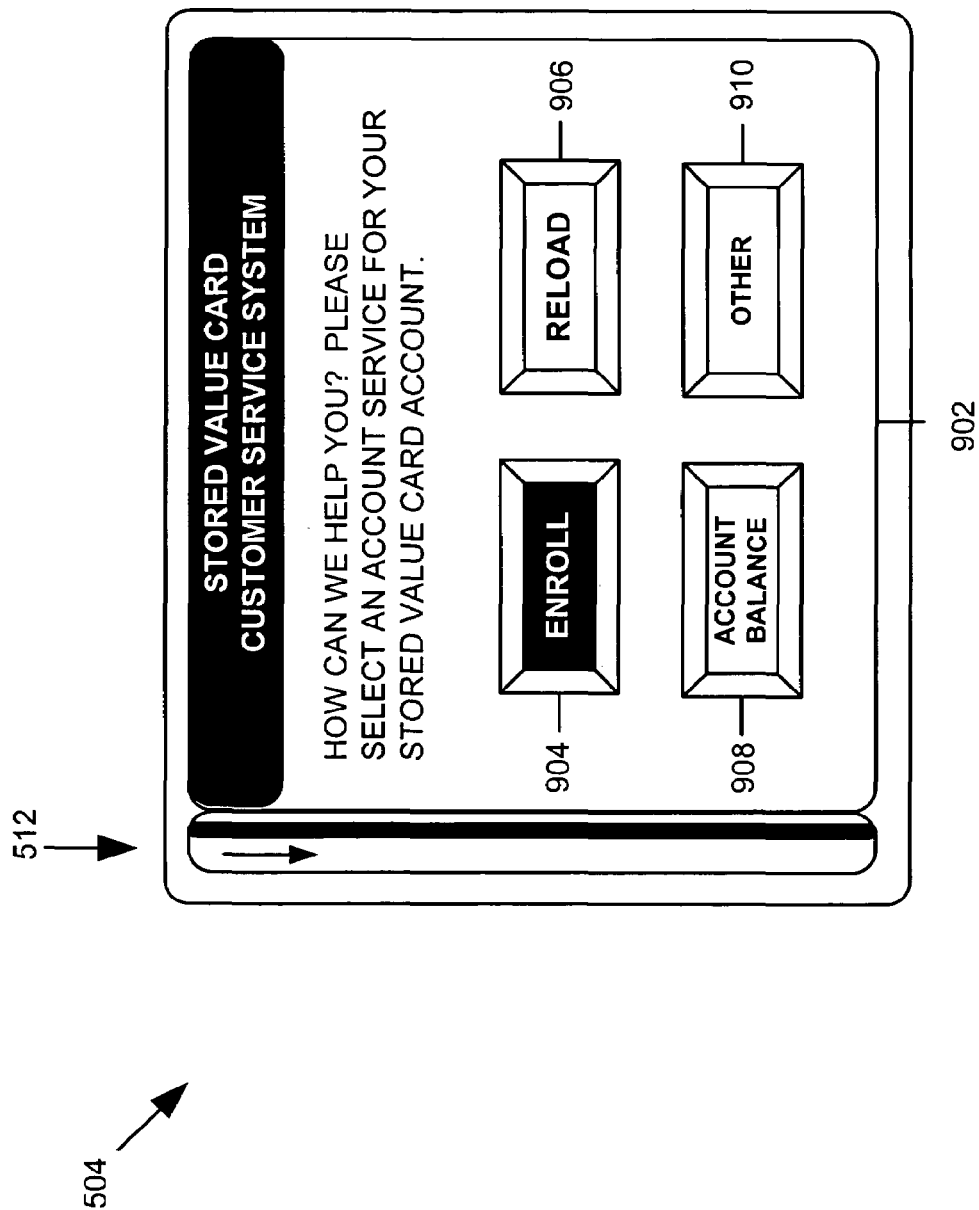
FIG. 9 is a perspective overhead view of an embodiment of the merchant terminal of FIG. 7 illustrating a user interface screen for selecting a stored value card service for enrolling a new customer.
Figure 10:
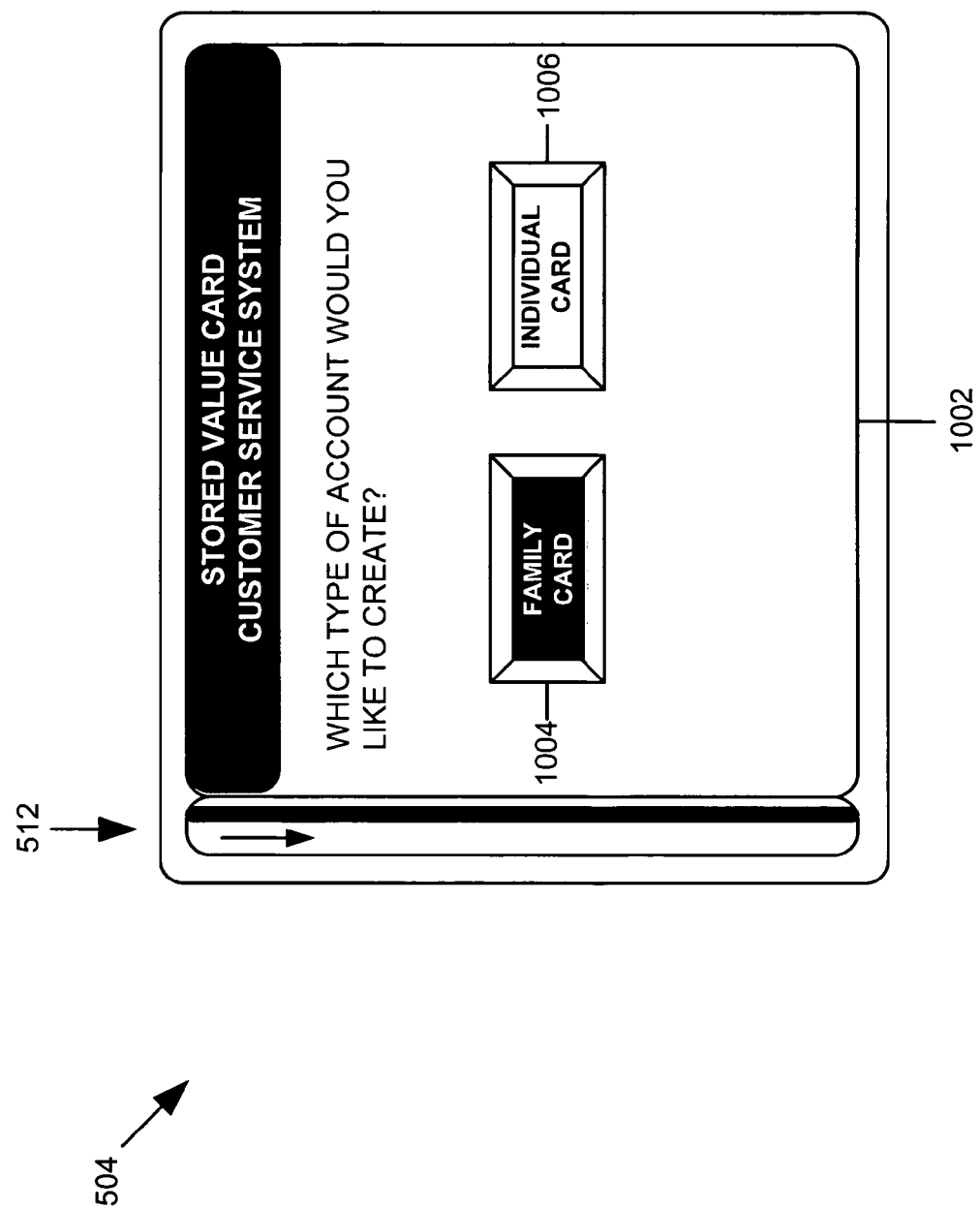
FIG. 10 illustrates another user interface screen for specifying a type of stored value card to enroll.

FIG. 8 illustrates the general operation of an enrollment process at merchant terminal 704 for enabling a primary account holder (i.e., an existing customer 610) to enroll additional new customer(s) in the family stored value card program. At block 802, the existing customer 610 requests to enroll a new customer in the family stored value card program. As illustrated in FIGS. 9 and 10, user interface 712 may support an interactive menu functionality that enables existing customers to select, initiate, etc. various services. FIG. 9 illustrates a perspective view of an embodiment of merchant terminal 704 which includes a display controlled by user interface 712. Card reader 706 includes a slot (indicated by the down arrow in FIG. 9) for inserting and swiping a stored value card 508.

In FIG. 9, an account services menu screen 902 is displayed which enables a customer 506 to select one or more services via buttons displayed on the screen. For example, in the embodiment of FIG. 9, user interface 712 displays an "enroll" button 904, a "reload" button 906, an "account balance" button 908, and an "other" button 910. Reload button 906 enables customers 506 to initiate a reload process whereby stored value card 508 may be loaded with additional funds. Account balance button 908 enables customer 506 to initiate an account balance inquiry process for checking the current balance associated with stored value card 508. Customers 506 may select other button 910 to access any of a variety of other services offered by merchant terminal 704.

Figure 11:
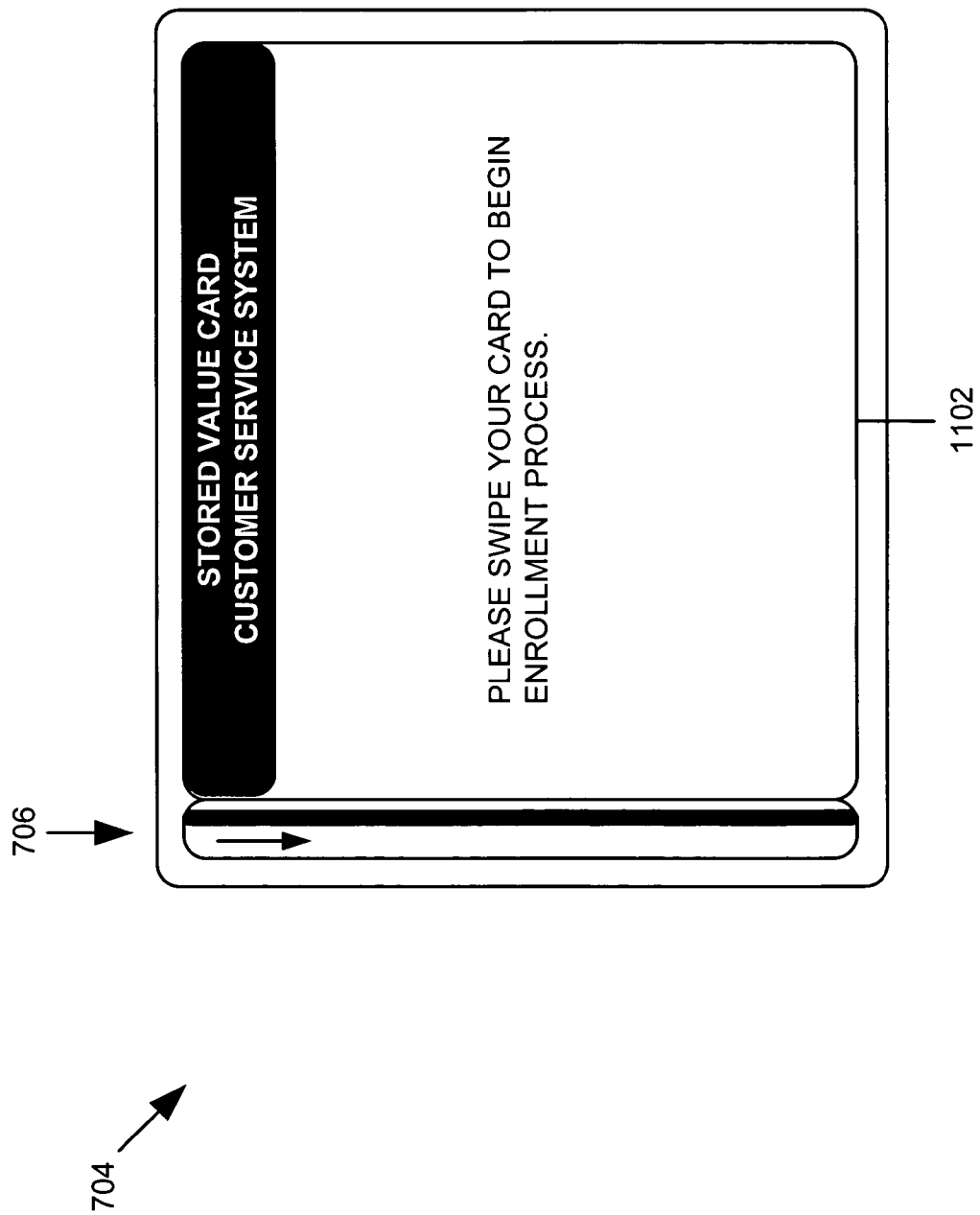
FIG. 11 illustrates another user interface screen for initiating the family card enrollment process.

Customers 506 (including existing customer(s) 610) may initiate an enrollment process by selecting enroll button 904. FIG. 10 illustrates an enrollment type input screen 1002 which prompts customer 506 to specify whether the enrollment is an individual card (button 1006) or a family card (button 1004). An existing customer 610 may initiate the enrollment process for a new secondary stored value card account 604, 606 or 608 by selecting button 1004. FIG. 11 illustrates another input screen 1102 which prompts the existing customer 610 to swipe the existing stored value card 508. Referring again to FIG. 8, at block 804, existing customer 610 swipes the existing stored value card 508 to further continue the enrollment process. At block 806, merchant terminal 704 identifies the stored value card account associated with the existing customer 610. The stored value card account may be identified based on the data read from magnetic stripe 710 via card reader 706, or in various other ways. At block 808, the existing customer 610 specifies a new customer (e.g., family member, relative, friend, etc.) to enroll in the family stored value card program. This information may be input via the interactive menu functionality supported by user interface 712. In alternative embodiments, the information may be manual input by a merchant representative. Furthermore, the information may be manually written on a new customer form and scanned into merchant terminal 704 by an optical scanner (not shown). At block 810, merchant terminal 704 may authenticate the desired new customer based on the input information. For example, merchant terminal 704 may compare the new customer information against a local and/or remote database. In one embodiment, merchant terminal 704 may compare the new customer information against a government database to check for compliance with various security provisions, such as the USA Patriot Act.

If the new customer is authenticated (block 810), at block 812, merchant terminal 704 may control the configuration of a secondary stored value card account 604, 606 or 608 for the new customer. The secondary stored value card account 604, 606 or 608 may be automatically configured based on the input information. Various aspects of the secondary stored value card account 604, 606 or 608 may be configured via the interactive menu functionality. For instance, the existing customer 610 may specify velocity limits, withdrawal limits, etc. The existing customer may also specify the method of delivery for the issued stored value card, such as delivery to the existing customer at merchant terminal 704 or direct delivery to the new customer. It should be appreciated that the configuration of the secondary stored value card account 604, 606 or 608 may include appropriate communications with back-end processing system 720. Furthermore, the actual creation of the account need not occur during the enrollment process. Rather, merchant terminal 704 may gather the necessary information to create the account during the enrollment process and then initiate the appropriate communications with back-end processing system 720 after the enrollment process has been completed.

At block 814, the existing customer 610 has the option of loading the new secondary stored value card account 604, 606 or 608 with funds. The existing customer 610 may load the new secondary stored value card account 604, 606 or 608 by depositing cash with the merchant representative. As described in more detail below with respect to family card funds transfer module 703, the existing customer may also transfer funds directly from the existing stored value card account 604, 606 or 608. At block 816, the new stored value card account (i.e., the secondary account created by the existing customer 610) may be linked or otherwise associated with the existing customer's stored value card account (i.e., the primary account). At block 818, the new stored value card may be delivered to and received by the new customer. At block 820, the new stored value card may be activated for use by the new customer. It should be appreciated that the stored value card services 504 (FIG. 5) made available to secondary stored value card accounts 604, 606 or 608 may be different than those made available to the primary account 602.

Figure 12:
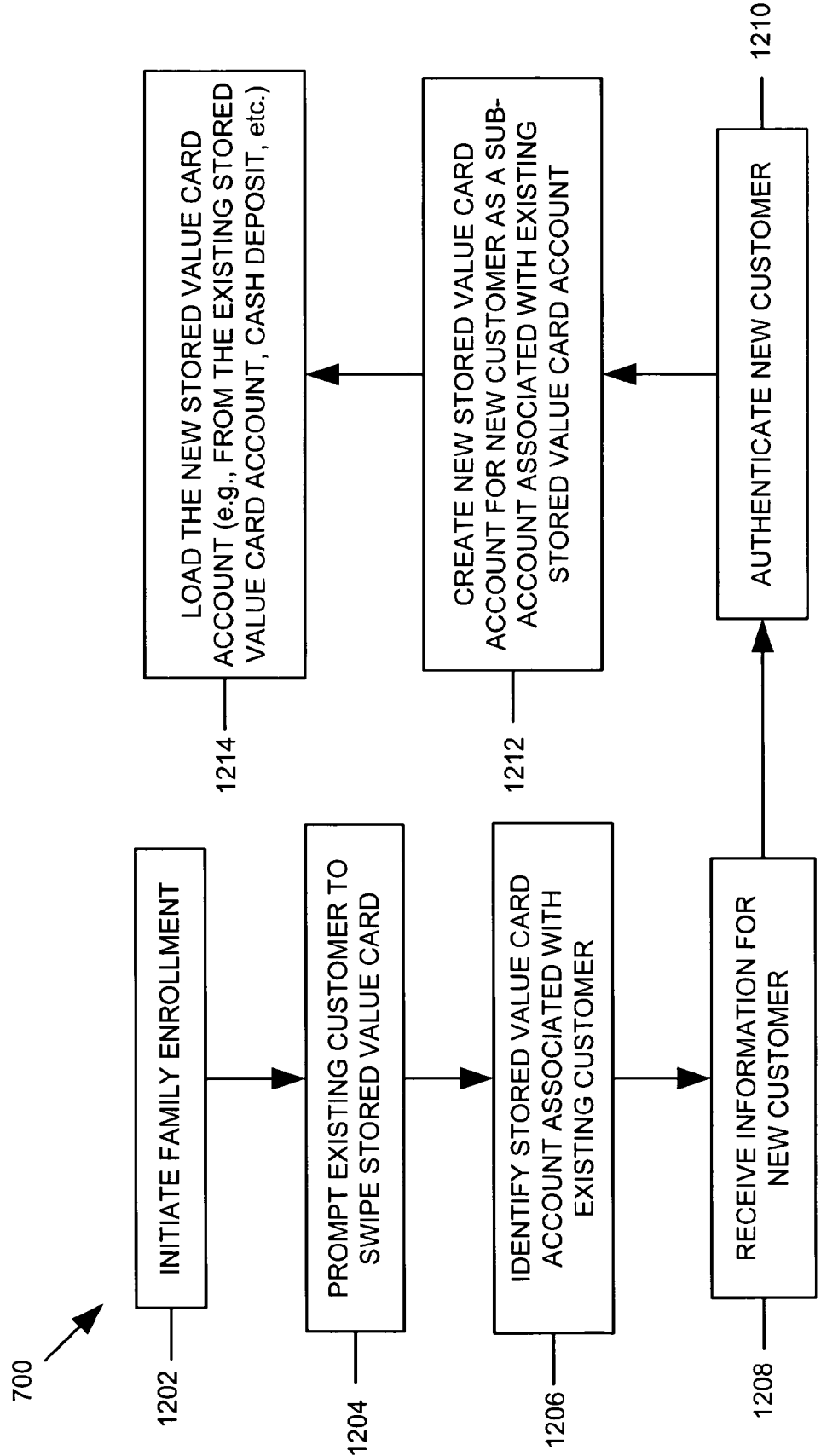
FIG. 12 is a flow chart illustrating the architecture, operation, and/or functionality of an embodiment of the family card enrollment module of FIG. 7.

FIG. 12 illustrates the general architecture, operation, and/or functionality of the software, hardware, firmware (or combination thereof) of family card enrollment module 700. At block 1202, family card enrollment module 700 is initiated. As mentioned above, family card enrollment module 700 may be initiated via the interactive menu functionality supported by user interface 712 (FIG. 9–10). At block 1204, family card enrollment module 700 prompts the existing customer 610 to swipe the existing stored value card 508. At block 1206, family card enrollment module 700 identifies the stored value card account associated with the swiped card by, for example, reading the data read from card reader 706. At block 1208, family card enrollment module 700 may receive information corresponding to the desired customer to enroll in the family stored value card program. As mentioned above, the customer information may be specified interactively via user interface 712, manually, or automatically via an optical scanner. Regardless of the input method, at block 1210, family card enrollment module 700 authenticates the new customer. At block 1212, a new secondary stored value card account 604, 606 or 608 is created for the new customer. At block 1214, the new account may be loaded by, for example, a cash deposit or a funds transfer from the primary account 602.

Figure 13:
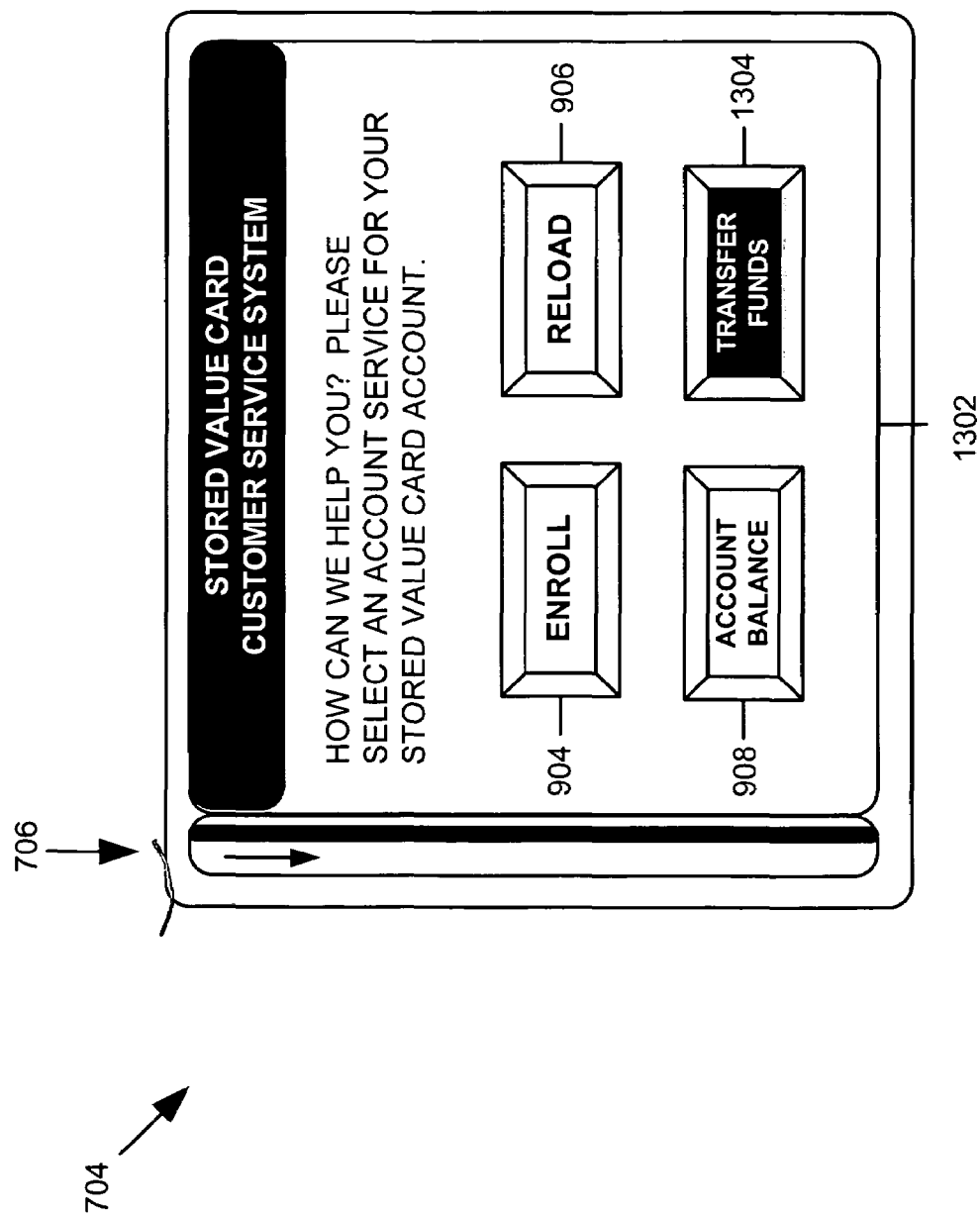
FIG. 13 illustrates another user interface screen of the merchant terminal of FIG. 7 for initiating a funds transfer.
Figure 14:
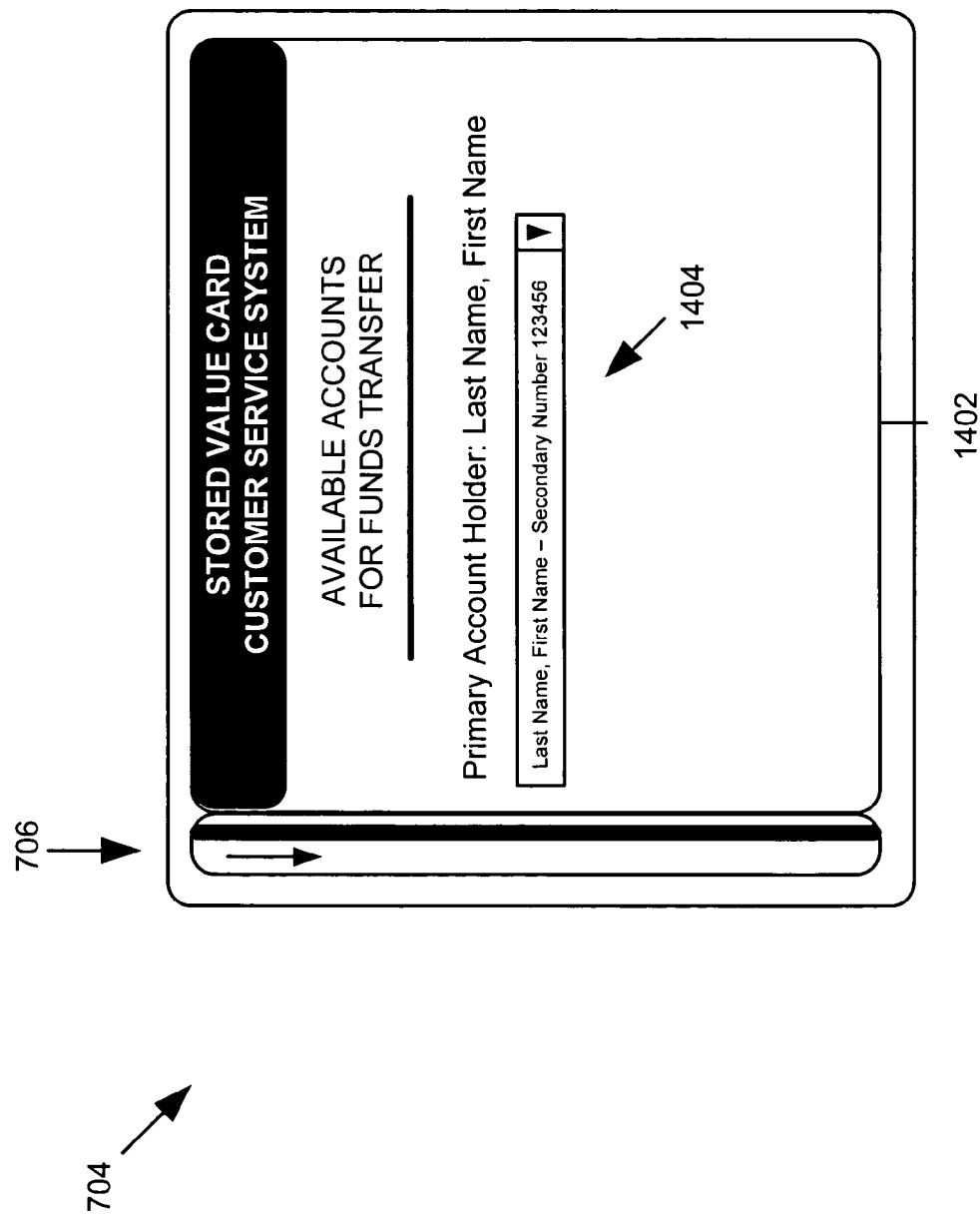
FIG. 14 illustrates another user interface screen for enabling an existing customer to transfer and/or load funds to a secondary account associated with the primary account.

An example of a direct funds transfer from the primary account to the new secondary account is described below with respect to FIGS. 13–17. In this regard, FIG. 17 illustrates the architecture, operation, and/or functionality of an embodiment of family card funds transfer module 703 (FIG. 7). At block 1702, a family funds transfer is initiated. FIG. 13 illustrates a user interface screen 1302 by which the primary account holder may initiate a family funds transfer by selecting a transfer funds button 1304. Referring again to FIG. 7, at block 1702, family card funds transfer module 703 prompts the existing customer to swipe an existing stored value card 508. At block 1706, family card funds transfer module 703 may identify the primary account holder. It should be appreciated that blocks 1704 and 1706 may be omitted where the transfer process is being performed along with the enrollment process as part of the original load of the new secondary stored value card account 604, 606 or 608. At block 1708, family card funds transfer module 703 prompts the primary account holder to select a sub-account or secondary account 604, 606 or 608 associated with the primary account to which the funds are to be transferred. FIG. 14 illustrates a funds transfer input screen 1402 which enables the primary account holder to select an account. Funds transfer input screen 1402 includes an automatic pull-down menu that includes the available accounts (e.g., all of the secondary accounts associated with the primary account). The primary account holder may select the desired account using the pull-down menu. The primary account holder may also specify an amount to be transferred from the primary account to the secondary account.

Figure 15:
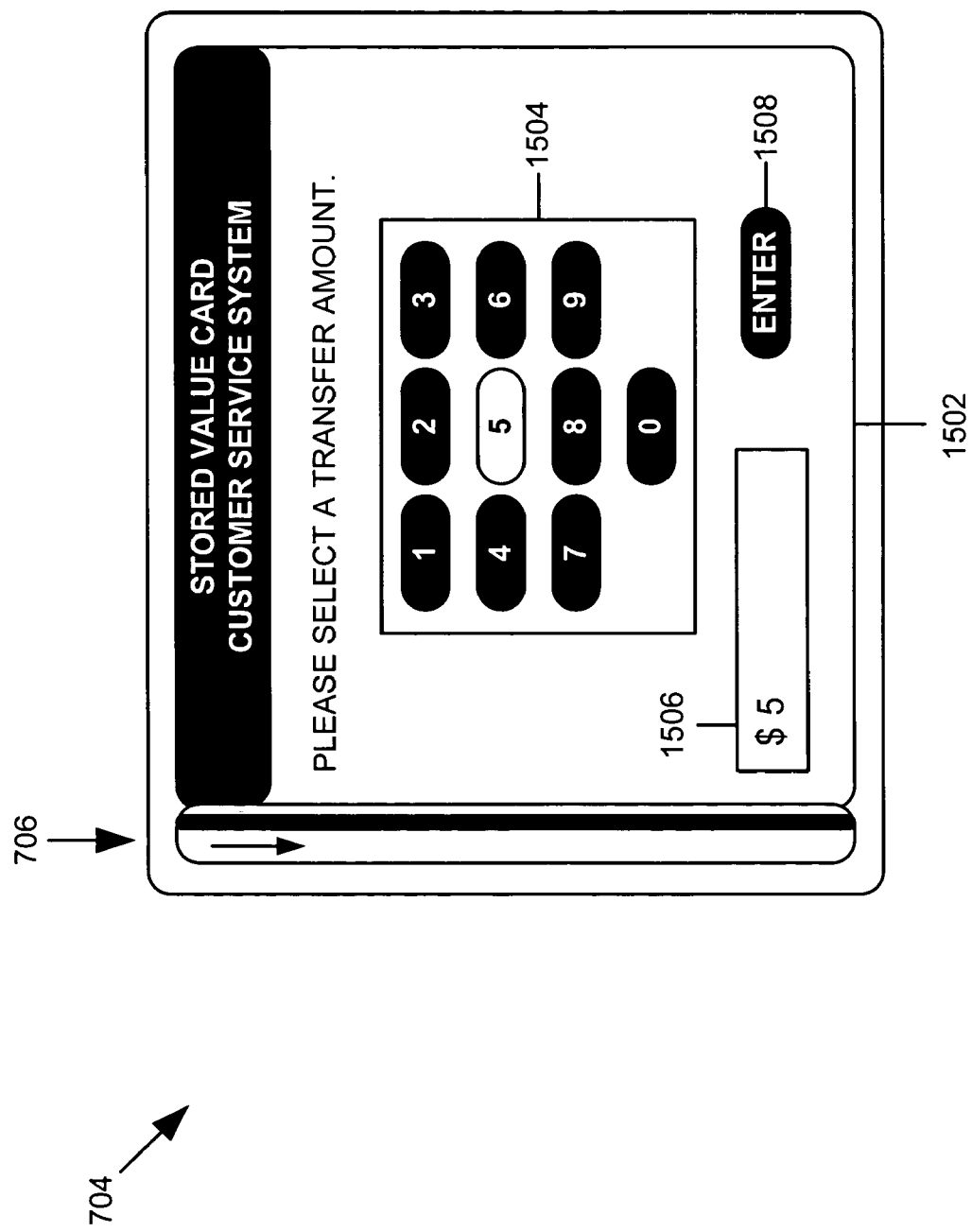
FIG. 15 illustrates another user interface screen for specifying a transfer amount.

FIG. 15 illustrates a transfer amount input screen 1502 which prompts the primary account holder to specify the desired amount to transfer from the primary account to the secondary account 604, 606 or 608. Input screen 1502 includes an interactive keypad 1504 which enables the primary account holder to input the desired dollar amount. As the keys are engaged, the digits may appear in a display box 1506. After the dollar amount is entered, an enter button 1508 may be engaged to submit the dollar amount for processing. Family card funds transfer module 703 may check the dollar amount against the balance in the primary account 602 to determine whether there are enough funds to complete the requested transfer. If there is enough to complete the requested transfer, at block 1712, family card funds transfer module 703 may initiate the requested transfer of funds. It should be appreciated that the actual processing of the funds transfer may be performed via back-end processing system 720, in which case family card funds transfer module 703 may initiate and/or control the appropriate communications to effectuate the funds transfer. Family card funds transfer module 703 need not actually perform the funds transfer.

Figure 16:
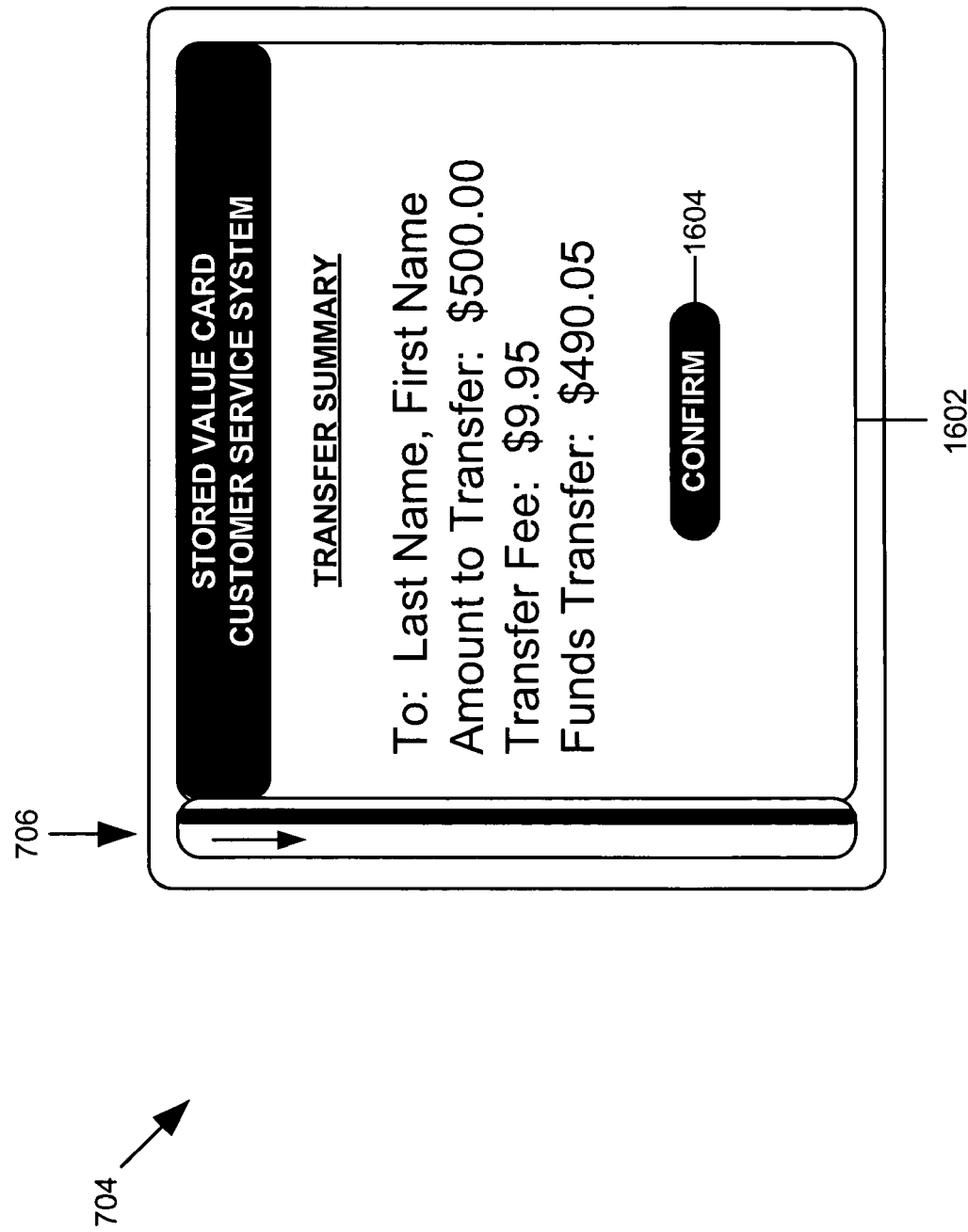
FIG. 16 illustrates another user interface screen for displaying a summary of the family card funds transfer process.

FIG. 16 illustrates a transaction summary display screen 1602 which may be used to display the requested funds transfer to the primary account holder for confirmation. If the requested funds transfer is correct, the primary account holder may confirm via button 1604. As illustrated in FIG. 16, merchant terminal 704 may enforce a transaction fee for transferring the funds, which may be charged to either the primary account holder or the secondary account holder. In the embodiment illustrated in FIG. 16, the transaction fee is charged to the primary account holder and, therefore, the requested transfer amount is appropriately reduced by the amount of the transfer fee.

One of ordinary skill in the art will appreciate that stored value card management system 701, family card enrollment module 700, and family card funds transfer module 703 may be implemented in software, hardware, firmware, or a combination thereof. Accordingly, in one embodiment, stored value card management system 701, family card enrollment module 700, and family card funds transfer module 703 are implemented in software or firmware that is stored in a memory and that is executed by a suitable instruction execution system (e.g., processor 708).

In hardware embodiments, stored value card management system 701, family card enrollment module 700, and family card funds transfer module 703 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks related to FIGS. 1–17 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, stored value card management system 701, family card enrollment module 700, and family card funds transfer module 703 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention. For example, it should be appreciated that the logical functions of stored value card management system 701, family card enrollment module 700, and family card funds transfer module 703 may be distributed in any suitable manner (e.g., portions at merchant terminal 704, portions at back-end processing system 720, etc.).

What is claimed is:

1. A method for implementing a stored value card program, the method comprising:

enrolling a first customer in a stored value card program with a first stored value card account;

enabling the first customer to create a second stored value card account for a second customer, wherein the second stored value card account comprises a secondary account associated with the first stored value account;

enabling the first customer to identify the second customer;

receiving information that identifies the second customer, wherein the information was provided by the first customer;

authenticating the second customer using information provided by the first customer;

responsive to the authentication of the second customer, creating the second stored value card account for the second customer; and establish a maximum value for an aggregate balance on the first stored value card account and the second stored value card account.

* * * * *